US010650760B2

(12) United States Patent
Hwang et al.

(10) Patent No.: US 10,650,760 B2
(45) Date of Patent: May 12, 2020

(54) DISPLAY DEVICE

(71) Applicant: Samsung Display Co., Ltd., Yongin-si (KR)

(72) Inventors: Hyun Sik Hwang, Hwaseong-si (KR); Bong Im Park, Hwaseong-si (KR); Ik Hyun Ahn, Hwaseong-si (KR); Hyeng-Woo Cho, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 5 days.

(21) Appl. No.: 15/669,488

(22) Filed: Aug. 4, 2017

(65) Prior Publication Data
US 2018/0182328 A1 Jun. 28, 2018

(30) Foreign Application Priority Data

Dec. 27, 2016 (KR) .................. 10-2016-0180124

(51) Int. Cl.
G09G 3/36 (2006.01)
G02F 1/1362 (2006.01)
G09G 5/10 (2006.01)

(52) U.S. Cl.
CPC ..... *G09G 3/3614* (2013.01); *G02F 1/136286* (2013.01); *G09G 3/3666* (2013.01); *G09G 5/10* (2013.01); *G09G 3/3674* (2013.01); *G09G 3/3685* (2013.01); *G09G 2300/0426* (2013.01); *G09G 2300/0447* (2013.01); *G09G 2300/0452* (2013.01); *G09G 2320/0209* (2013.01); *G09G 2320/0247* (2013.01)

(58) Field of Classification Search
CPC ... G09G 3/3614; G09G 5/10; G02F 1/136286
USPC .................. 345/694, 690, 211, 100; 348/731
See application file for complete search history.

(56) References Cited

U.S. PATENT DOCUMENTS 6,226,057 B1 * 5/2001 Lee .................. G02F 1/134336
349/139
7,495,646 B2 * 2/2009 Kawabe ................ G09G 3/342
345/95

(Continued)

FOREIGN PATENT DOCUMENTS

KR 10-0951350 4/2010
KR 10-1266723 5/2013
KR 10-1286516 7/2013

*Primary Examiner* — Prabodh M Dharia
(74) *Attorney, Agent, or Firm* — H.C. Park & Associates, PLC

(57) ABSTRACT

A display device includes a display panel including unit areas. Each of the unit areas includes pixels arranged in a matrix formation; and data lines (DLs) connected to the pixels. The display device is configured to: apply data voltages of a same polarity to first DLs positioned between adjacent pixel columns; and apply DVs of different polarities to second DLs positioned at respective sides of each pixel column. Each of the pixels is connected to one of the second DLs. A connection direction between the pixels and the DLs in each of a plurality of pixel rows is changed in a determined pixel column interval. Connection directions between the pixels and the DLs are opposite each other in odd-numbered pixel rows adjacent in a column direction. Connection directions between the pixels and the DLs are opposite each other in even-numbered pixel rows adjacent in the column direction.

21 Claims, 19 Drawing Sheets

(56) References Cited

U.S. PATENT DOCUMENTS

| | | | | |
|---|---|---|---|---|
| 8,451,205 B2* | 5/2013 | Kitayama | ............ | G09G 3/3614 345/100 |
| 9,013,388 B2* | 4/2015 | Katsuta | ................. | G09G 3/003 345/92 |
| 10,163,936 B2* | 12/2018 | Kim, II | ................. | H01L 27/124 |
| 2004/0066394 A1* | 4/2004 | Tokunaga | ............ | G09G 3/2022 345/690 |
| 2006/0202927 A1 | 9/2006 | Lee | | |
| 2008/0036721 A1 | 2/2008 | Kim et al. | | |
| 2008/0180372 A1* | 7/2008 | Kim | ..................... | G09G 3/3677 345/87 |
| 2011/0157502 A1* | 6/2011 | Qiao | ................... | G09G 3/3614 349/37 |
| 2011/0221727 A1* | 9/2011 | Kim | ..................... | G09G 3/3614 345/209 |
| 2013/0256707 A1* | 10/2013 | Chiang | .................. | H01L 33/08 257/88 |
| 2013/0271357 A1* | 10/2013 | Wang | ................... | G09G 3/3677 345/92 |
| 2013/0278835 A1* | 10/2013 | Kitayama | ............ | G09G 3/3614 348/731 |
| 2013/0314389 A1* | 11/2013 | Wang | ................... | G09G 3/3648 345/211 |
| 2013/0321251 A1* | 12/2013 | Kang | ....................... | G09G 3/36 345/87 |
| 2014/0085279 A1* | 3/2014 | Shiomi | ................ | G09G 3/2074 345/204 |
| 2015/0035740 A1* | 2/2015 | Gondo | ................ | G09G 3/3614 345/96 |
| 2015/0168794 A1* | 6/2015 | Park | ...................... | G09G 3/3659 349/48 |
| 2015/0187292 A1* | 7/2015 | Kim | ..................... | G09G 3/3614 345/88 |
| 2015/0199932 A1* | 7/2015 | Ohara | .................. | G09G 3/3233 345/212 |
| 2015/0309360 A1* | 10/2015 | Wang | ................... | G09G 3/3607 345/694 |
| 2016/0035302 A1* | 2/2016 | Sun | ....................... | G09G 3/3648 345/209 |
| 2016/0231979 A1* | 8/2016 | Patil | ...................... | G06F 3/1462 |
| 2017/0017125 A1* | 1/2017 | Wang | ................... | G02F 1/134309 |
| 2017/0053624 A1* | 2/2017 | Hayashi | ................. | G09G 5/391 |
| 2017/0229078 A1* | 8/2017 | Xin | ......................... | G02F 1/13 |
| 2017/0263170 A1* | 9/2017 | Mu | ....................... | G09G 3/3614 |
| 2018/0053461 A1* | 2/2018 | Tien | .................... | G09G 3/2003 |
| 2018/0053478 A1* | 2/2018 | Xu | ..................... | G02F 1/136286 |
| 2018/0095333 A1* | 4/2018 | Lin | ................... | G02F 1/134327 |
| 2018/0157096 A1* | 6/2018 | Guo | ....................... | G09G 3/3614 |

* cited by examiner

DISPLAY DEVICE

CROSS-REFERENCE TO RELATED APPLICATION

This application claims priority from and the benefit of Korean Patent Application No. 10-2016-0180124, filed Dec. 27, 2016, which is hereby incorporated by reference for all purposes as if fully set forth herein.

BACKGROUND

Field

Exemplary embodiments relate to a display device. More particularly, exemplary embodiments relate to display device capable of improving crosstalk and flicker.

Discussion

Liquid crystal displays (LCDs) are one of the most widely used flat panel displays. A liquid crystal display typically includes display panels in which electrodes are formed, and a liquid crystal layer interposed between the display panels. Voltage applied to the electrodes form an electric field so as to align liquid crystal molecules of the liquid crystal layer, to control transmittance of light depending on the alignment of the liquid crystal molecules, and, in this manner, to display an image. Liquid crystal displays are typically light weight and have a thin formation. It is noted, however, that liquid crystal displays may have lower lateral visibility than front visibility. Various types of liquid crystal arrangements and driving methods have been developed to address differences in the lateral and frontal visibilities. It is also noted that, in liquid crystal displays, issues, such as crosstalk where horizontal lines or vertical lines are visible on a screen, flicker in which the screen is flickering, etc., can occur based on coupling between a data line and a pixel electrode, coupling between the data line and a common electrode, and a number differences between positive polarity pixels and negative polarity pixels.

The above information disclosed in this section is only for enhancement of an understanding of the background of the inventive concepts, and, therefore, it may contain information that does not form prior art already known to a person of ordinary skill in the art.

SUMMARY

One or more exemplary embodiments provide a display device that is capable of improving lateral visibility and improving crosstalk and flicker.

Additional aspects will be set forth in the detailed description which follows, and, in part, will be apparent from the disclosure, or may be learned by practice of the inventive concepts.

According to one or more exemplary embodiments, a display device includes a display panel including unit areas. Each of the unit areas includes pixels arranged in a matrix formation, and data lines connected to the pixels. The display device is configured to: apply data voltages of a same polarity to first data lines of the data lines, the first data lines being positioned between adjacent pixel columns; and apply data voltages of different polarities to second data lines of the data lines, the second data lines being positioned at respective sides of each pixel column. Each of the pixels is connected to one of the second data lines. A connection direction between the pixels and the data lines in each of a plurality of pixel rows is changed in a determined pixel column interval. Connection directions between the pixels and the data lines are opposite each other in odd-numbered pixel rows adjacent in a column direction. Connection directions between the pixels and the data lines are opposite each other in even-numbered pixel rows adjacent in the column direction.

According to one or more exemplary embodiments, a display device includes: pixels arranged in a matrix formation; and data lines connected to the pixels. The display device is configured to: apply data voltages of a same polarity to first data lines of the data lines, the first data lines being positioned between adjacent pixel columns; and apply data voltages of different polarities to second data lines of the data lines, the second data lines being positioned at respective sides of each pixel column. The pixels include: a plurality of high level pixels to receive a data voltage of a relatively high luminance; and a plurality of low level pixels to receive a data voltage of a relatively low luminance. A number of high level pixels of the plurality of high level pixels connected to first data lines of a positive polarity of the data lines, a number of high level pixels of the plurality of high level pixels connected to second data lines of a negative polarity of the data lines, a number of low level pixels of the plurality of low level pixels connected to the first data lines, and a number of low level pixels of the plurality of low level pixels connected to the second data lines are equal to each other.

According to one or more exemplary embodiments, a display device can be configured to improve lateral visibility by using high level pixels and low level pixels, and a data line connection structure of the high level pixels and the low level pixels may be optimized (or otherwise configured) to eliminate (or reduce) the above-noted crosstalk and/or flicker issues.

The foregoing general description and the following detailed description are exemplary and explanatory and are intended to provide further explanation of the claimed subject.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
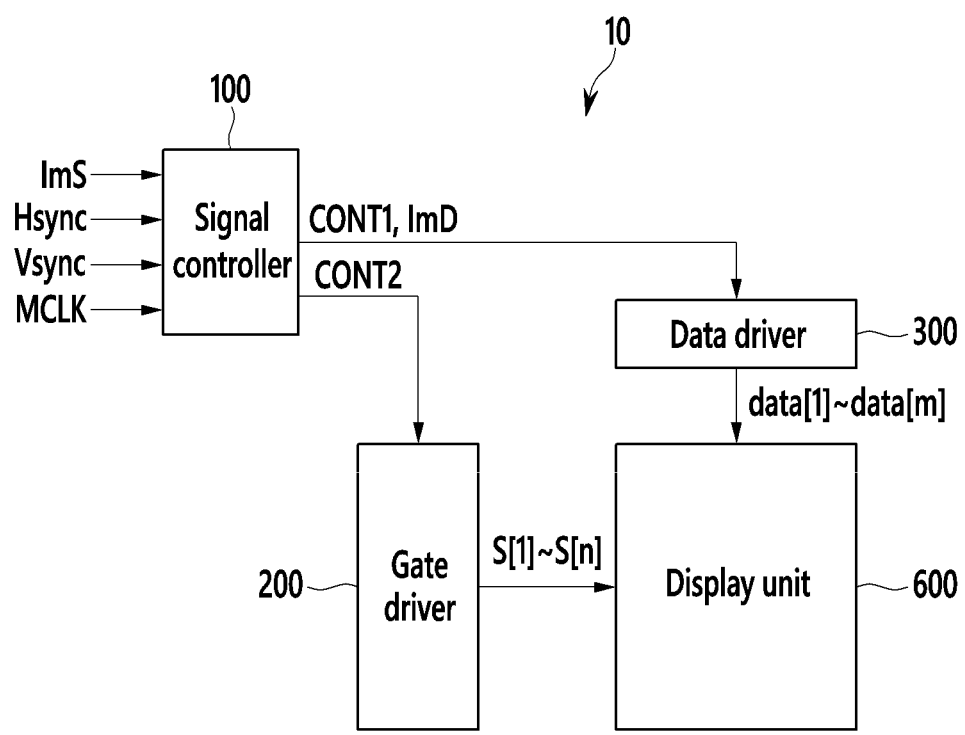
FIG. 1 is a block diagram schematically showing a display device according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, aspects, etc. (hereinafter collectively referred to as "elements"), of the various illustrations may be otherwise combined, separated, interchanged, and/or rearranged without departing from the disclosed exemplary embodiments.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying figures, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items. Further, for the purposes of this disclosure, the phrase "on a plane" means viewing a target portion from the top, and the phrase "on a cross-section" means viewing a cross-section formed by vertically cutting a target portion from the side. Also, for the purposes of this disclosure, the phrase "overlapping" means to be vertically overlapped on a cross-section, or positioning all or a part in the same region on a plane.

Although the terms "first," "second," etc. may be used herein to describe various elements, these elements should not be limited by these terms. These terms are used to distinguish one element from another element. Thus, a first element discussed below could be termed a second element without departing from the teachings of the present disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is customary in the field, exemplary embodiments are described and illustrated in the drawings in terms of functional blocks, drivers, units, and/or modules. Those skilled in the art will appreciate that these blocks, drivers, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, drivers, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of exemplary embodiments may be physically separated into two or more interacting and discrete blocks, units, and/or modules without departing from the spirit and scope of the inventive concepts. Further, the blocks, units, and/or modules of exemplary embodiments may be physically combined into more complex blocks, units, and/or modules without departing from the spirit and scope of the inventive concepts An exemplary display device will be described with reference to FIGS. 1 to 5.

FIG. 1 is a block diagram schematically showing a display device according to one or more exemplary embodiments.

Referring to FIG. 1, a display device 10 includes a signal controller 100, a gate driver 200, a data driver 300, and a display unit (or panel) 600. The display device 10 may be a liquid crystal display, and the display device 10 may further include a backlight unit (not shown) emitting light to the display unit 600.

The signal controller 100 receives an image signal ImS and a synchronization signal that are input from, for instance, an external device. The image signal ImS stores luminance information for a plurality of pixels (not shown). The luminance may have a gray level of a determined number, for example, $1024=2^{10}$, $256=2^8$, $64=2^6$, etc. The synchronization signal includes a horizontal synchronization signal Hsync, a vertical synchronization signal Vsync, and a main clock signal MCLK.

The signal controller 100 generates a first driving control signal CONT1, a second driving control signal CONT2, and an image data signal ImD according to an image signal ImS, and a horizontal synchronization signal Hsync, a vertical synchronization signal Vsync, and a main clock signal MCLK.

The signal controller 100 divides the image signal ImS for each frame unit (or frame) according to the vertical synchronization signal Vsync and the image signal ImS for each gate line unit (or gate line) according to the horizontal synchronization signal Hsync to generate an image data signal ImD. The signal controller 100 transmits the image data signal ImD to the data driver 300 along with the first driving control signal CONT1. The signal controller 100 transmits the second driving control signal CONT2 to the gate driver 200.

The display unit 600 is a display area including the plurality of pixels. In the display unit 600, a plurality of gate lines (not shown) substantially extending in a row direction to be parallel to each other and a plurality of data lines (not illustrated) substantially extending in a column direction to be parallel to each other are formed to be connected to the plurality of pixels.

A plurality of pixels each may emit light of one of primary colors. Examples of primary colors may include primary colors of red, green, and blue, and a desired color may be displayed with a spatial sum and/or a temporal sum of the primary colors. A color may be displayed by a red pixel, a green pixel, and a blue pixel, and a combination of the red pixel, the green pixel, and the blue pixel may be referred to as a pixel. Exemplary embodiments, however, are not limited thereto or thereby. In this manner, any suitable color and/or groups of colors may be utilized in association with exemplary embodiments.

The gate driver 200 is connected to a plurality of scan (or gate) lines (not illustrated), and generates a plurality of scan signals S[1]-S[n] according to the second driving control signal CONT2. The scan driver 200 sequentially applies scan signals S[1]-S[n] of a gate-on voltage to the plurality of scan lines.

The data driver 300 is connected to a plurality of data lines (not shown), samples and holds an input image data signal ImD according to the first driving control signal CONT1, and transfers a plurality of data signals data[1]-data[m] to the plurality of data lines. The data driver 300 applies the data signals data[1]-data[m] according to the image data signal ImD to a plurality of data lines in synchronization with timing at which each of the scan signals S[1]-S[n] becomes the gate-on voltage.

The plurality of pixels include a high level pixel and a low level pixel, and the display device 10 may improve lateral visibility by using the high level pixel and the low level pixel. Also, in the display device 10, a data line connection structure of the high level pixel and the low level pixel may be realized as a structure to prevent (or reduce) the crosstalk and the flicker. This will be described in more detail with reference to FIGS. 2 to 5.

Figure 2:
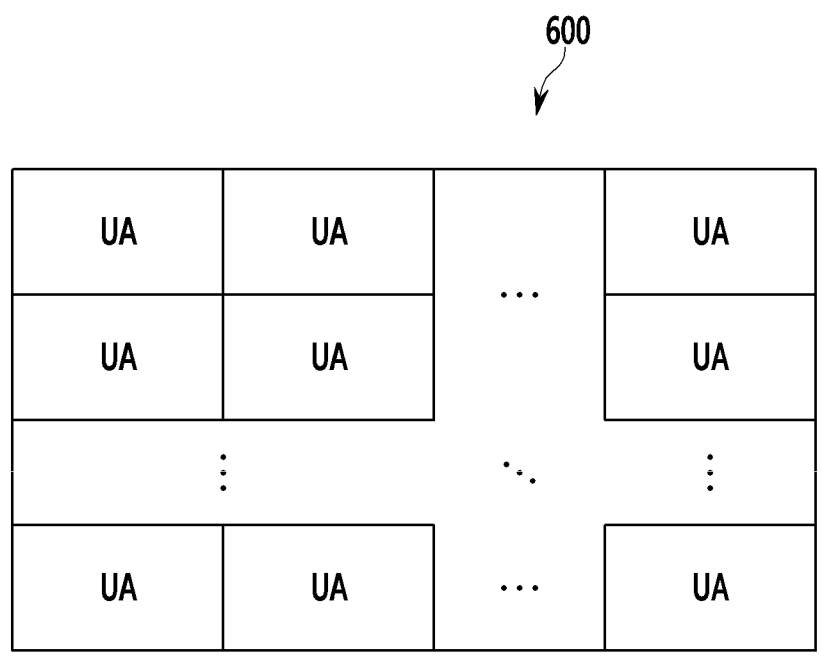
FIG. 2 is a block diagram showing unit areas of a display unit of the display device of FIG. 1 according to one or more exemplary embodiments.
Figure 3:
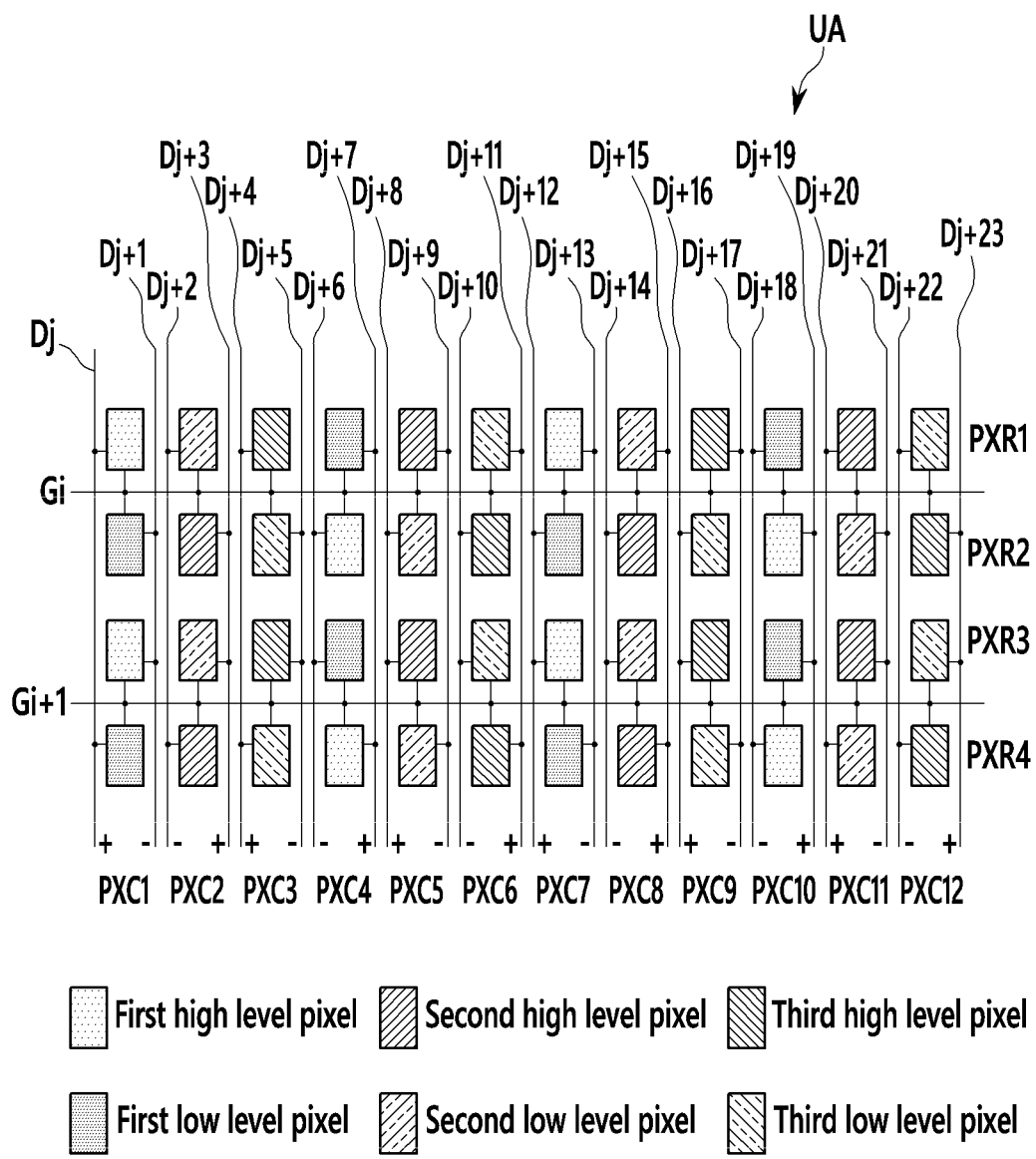
FIG. 3 is a view showing a configuration of a unit area of a display unit according to one or more exemplary embodiments.
Figure 4:
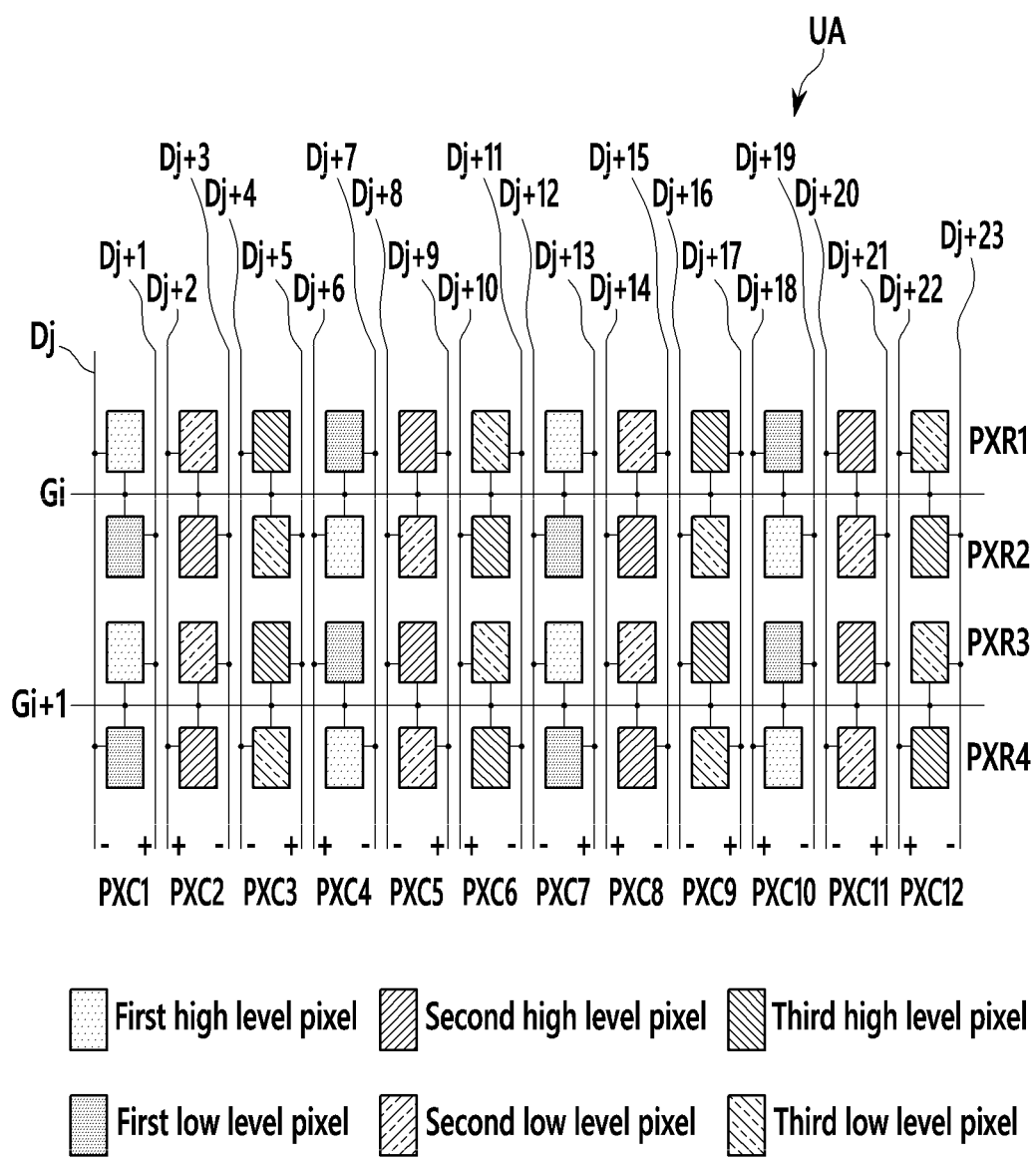
FIG. 4 is a view showing polarity inversion of a data voltage applied to a data line in a configuration of the unit area of FIG. 3 according to one or more exemplary embodiments.
Figure 5:
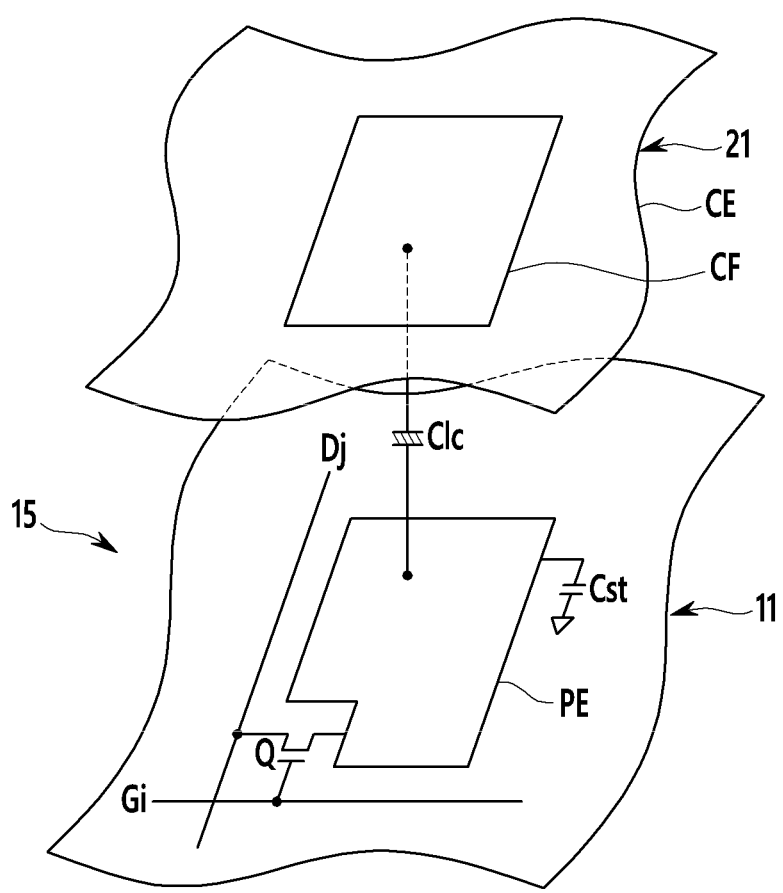
FIG. 5 is a view showing a pixel according to one or more exemplary embodiments.

FIG. 2 is a block diagram showing unit areas of a display unit of the display device of FIG. 1 according to one or more exemplary embodiments. FIG. 3 is a view showing a configuration of a unit area of a display unit according to one or more exemplary embodiments. FIG. 4 is a view showing polarity inversion of a data voltage applied to a data line in a configuration of the unit area of FIG. 3 according to one or more exemplary embodiments. FIG. 5 is a view showing a pixel according to one or more exemplary embodiments.

Referring to FIG. 2, the display unit 600 includes a plurality of unit areas UA. In the display unit 600, the plurality of unit areas UA may be arranged in a matrix shape disposed in the row direction and the column direction; however, exemplary embodiments are not limited thereto or thereby. A number of the unit areas UA included in the display unit 600 is not limited.

Referring to FIGS. 3 and 4, one unit area UA among the plurality of unit areas UA included in the display unit 600 is described. A configuration of the rest of the unit areas UA among the plurality of unit areas UA and a connection relationship between the configurations may be the same as the configuration of the unit area UA shown in FIG. 3 and the connection relationship between the configurations.

The unit area UA includes a plurality of pixels arranged in the matrix shape, a plurality of data lines Dj to D(j+23) connected to the plurality of pixels, and a plurality of gate lines Gi and G(i+1) connected to the plurality of pixels.

The plurality of pixels included in the unit area UA may be arranged in the matrix shape of four rows and twelve columns. That is, the plurality of pixels may be arranged in the matrix shape having the pixel rows PXR1 to PXR4 of four rows and the pixel columns PXC1 to PXC12 of twelve columns. Each of the plurality of pixels may have a longer shape in a column direction than a row direction.

A pixel may be one of a high level pixel and a low level pixel. The high level pixel is a pixel applied with the data voltage having the relatively high luminance for the same gray level, and the low level pixel is a pixel applied with the data voltage having the relatively low luminance for the same gray level. That is, the high level pixel and the low level pixel receive the data voltages depending on gamma curves that are different from each other.

The high level pixel may be one among a first high level pixel of a first color, a second high level pixel of a second color, and a third high level pixel of a third color. The low level pixel may be one among a first low level pixel of the first color, a second low level pixel of the second color, and a third low level pixel of the third color. The first color maybe red, the second color may be green, and the third color may be blue. However, the first to third colors may be displayed by a spatial sum or a temporal sum, and a kind of the colors is not limited.

The first high level pixel displays the same color (e.g., red) as the first low level pixel, however, it may display the image with the relatively high luminance for the same gray level. The second high level pixel displays the same color (e.g., green) as the second low level pixel, however, it may display the image with the relatively high luminance for the same gray level. The third high level pixel displays the same color (e.g., blue) as the third low level pixel, however, it may display the image with the relatively high luminance for the same gray level.

The plurality of pixels may be alternately arranged in the row direction with an order of the first color, the second color, and the third color. Also, the high level pixel and the low level pixel may be alternately arranged in the row direction and in the column direction.

The plurality of gate lines Gi and G(i+1) may extend and be positioned in the row direction between the corresponding two pixel rows. That is, the plurality of gate lines Gi and G(i+1) may be positioned one-by-one for two pixel rows. For example, the first gate line Gi may extend in the row direction between the first pixel row PXR1 and the second pixel row PXR2, and may be connected to the plurality of pixels of the first pixel row PXR1 and the plurality of pixels of the second pixel row PXR2. Also, the second gate line G(i+1) may extend in the row direction between the third pixel row PXR3 and the fourth pixel row PXR4, and may be connected to the plurality of pixels of the third pixel row PXR3 and the plurality of pixels of the fourth pixel row PXR4. A number of the plurality of gate lines Gi and G(i+1) may be half of the number of the pixel rows PXR1 to PXR4.

The different data lines Dj to D(j+23) may be positioned at both sides of each of the plurality of pixel columns PXC1 to PXC12, and two data lines may be positioned between the adjacent pixel columns. The data voltages of the same polarity may be applied to two data lines positioned between the adjacent pixel columns, and the data voltages of the different polarities may be applied to the data lines of both sides of each of the pixel columns PXC1 to PXC12. The number of the plurality of data lines Dj to D(j+23) is double that of the number of pixel columns PXC1 to PXC12.

For example, as shown in FIG. 3, the positive (+) data voltage may be applied to the first data line Dj positioned at a first side of the first pixel column PXC1, and the negative (−) data voltage may be applied to the second data line D(j+1) of a second side of the first pixel column PXC1. Here, the first side may be a left side and the second side may be a right side. The negative (−) data voltage may be applied to the second data line D(j+1) and the third data line D(j+2) positioned between the first pixel column PXC1 and the second pixel column PXC2. Also, the positive (+) data voltage may be applied to the fourth data line D(j+3) and the fifth data line D(j+4) positioned between the second pixel column PXC2 and the third pixel column PXC3. As described above, the plurality of data voltages applied from the first data line Dj to the twenty-fourth data line D(j+23) may have the polarity that is repeated in the order of positive (+), negative (−), negative (−), and positive (+).

The polarity of the data voltage applied to the plurality of data lines Dj to D(j+23) may be reversed by a frame unit. For example, when the data voltage having the polarity illustrated in FIG. 3 in the first frame is applied to the plurality of data lines Dj to D(j+23), the plurality of data voltages applied from the first data line Dj to the twenty-fourth data line D(j+23) may have the polarity repeated in the order of negative (−), positive (+), positive (+), and negative (−) in the following second frame as shown in FIG. 4. Also, in the following third frame, the data voltage having the polarity described in FIG. 3 may be applied to the plurality of data lines Dj to D(j+23).

Each of the plurality of pixels may be connected to one of the data lines at both sides adjacent thereto. That is, each of the plurality of pixels may be connected to one of the data lines of the adjacent first side and the data line of the adjacent second side. In this case, in each of the plurality of pixel rows, a connection direction between the plurality of pixels and the plurality of data lines Dj to D(j+23) may be changed with a determined pixel column interval. Also, the connection direction between the plurality of pixels and the plurality of data lines Dj to D(j+23) may be opposite to each other in the odd-numbered pixel rows adjacent in the column direction, and the connection direction between the plurality of pixels and the plurality of data lines Dj to D(j+23) may be opposite to each other in the even-numbered pixel rows adjacent in the column direction. Further, the plurality of pixels of the odd-numbered pixel rows and the plurality of pixels of the even-numbered pixel rows, which are connected to the same gate lines Gi and G(i+1), may be connected to the plurality of data lines Dj to D(j+23) in different directions from each other.

As shown in FIGS. 3 and 4, in the first pixel row PXR1 and the fourth pixel row PXR4, the pixels of the first to third columns PXC1 to PXC3 may be connected to the data line adjacent to the first side, and the pixels of the fourth to ninth columns PXC4 to PXC9 may be connected to the data line adjacent to the second side. The pixels of the tenth to twelfth columns PXC10 to PXC12 may be connected to the data line adjacent to the first side. Also, in the second pixel row PXR2 and the third pixel row PXR3, the pixels of the first to third columns PXC1 to PXC3 may be connected to the data line adjacent to the second side, the pixels of the fourth to ninth columns PXC4 to PXC9 may be connected to the data line adjacent to the first side, and the pixels of the tenth to twelfth columns PXC10 to PXC12 may be connected to the data line adjacent to the second side. Here, the first side may be each left side of the plurality of pixels and the second side may be each right side of the plurality of pixels.

Referring to FIG. 5, one pixel among the plurality of pixels included in the unit area UA is shown. The pixel includes a switching element Q, and a liquid crystal capacitor Clc, and a storage capacitor Cst that are connected thereto.

The switching element Q may be a three-terminal element, such as a transistor, provided in a first display panel (or on a first display substrate) 11. The switching element Q includes a gate terminal connected to an i-th gate line Gi, a first terminal connected to a j-th data line Dj, and a second terminal connected to the liquid crystal capacitor Clc and the storage capacitor Cst.

The liquid crystal capacitor Clc includes a pixel electrode PE and a common electrode CE as two terminals, and a liquid crystal layer 15 between the pixel electrode PE and the common electrode CE functions as a dielectric material. The liquid crystal layer 15 has dielectric anisotropy. A pixel voltage is formed by a voltage difference between the pixel electrode PE and the common electrode CE.

The pixel electrode PE is connected to the switching element Q to receive the data voltage. The common electrode CE receives a common voltage. The common voltage may be a voltage of about 0 V or a determined voltage. The data voltage that is higher than the common voltage with respect to the common voltage may be a positive data voltage, and the data voltage that is lower than the common voltage may be a negative data voltage.

The common electrode CE may be disposed on an entire surface of the second display panel (or substrate) 21 facing the first display panel 11. Differently from FIG. 5, the common electrode CE may be disposed in the first display panel 11, and, in this case, at least one of the pixel electrode PE and the common electrode CE may be made as a linear or bar type.

The storage capacitor Cst, which plays a subordinate role of the liquid crystal capacitor Clc, is formed by overlapping a separate signal line (not illustrated) included in the first display panel 11 and the pixel electrode PE with an insulator therebetween.

A color filter CF may be positioned in the second display panel 21. Further, the color filter CF may be positioned on or under the pixel electrode PE of the first display panel 11.

In the pixel structure, when the data voltage is applied to the j-th data line Dj, coupling is generated between the j-th data line Dj and the pixel electrode PE, and coupling is generated between the j-th data line Dj and the common electrode CE. Accordingly, the pixel voltage is changed from a desired value such that crosstalk in which a transverse line or a longitudinal line is recognized may be generated. Also, the number of positive polarity pixels applied with the positive data voltage and the number of negative polarity pixels applied with the negative data voltage are not equal between the frames such that the flicker in which the screen flickers may be generated. However, by connecting the plurality of pixels and the data lines as shown in FIGS. 3 and 4, the crosstalk and the flicker may not be generated.

Again referring to FIGS. 3 and 4, in the unit area UA, the number of high level pixels connected to the data line applied with the positive data voltage, the number of high level pixels connected to the data line applied with the negative data voltage, the number of low level pixels connected to the data line applied to the positive data voltage, and the number of low level pixels connected to the data line applied with the negative data voltage are equal to each other.

Hereafter, for convenience of description, the data line applied with the positive data voltage is referred to as a positive data line, and the data line applied with the negative data voltage is referred to as a negative data line.

As shown in FIGS. 3 and 4, the number of first high level pixels connected to the positive data line and the number of first high level pixels connected to the negative data line are equal to each other, and may be four. The number of second high level pixels connected to the positive data line and the number of second high level pixels connected to the negative data line are equal to each other, and may be four. The number of third high level pixels connected to the positive data line and the number of third high level pixels connected to the negative data line are equal to each other, and may be four. The number of first low level pixels connected to the positive data line and the number of first low level pixels connected to the negative data line are equal to each other, and may be four. The number of second low level pixels connected to the positive data line and the number of second low level pixels connected to the negative data line are equal to each other, and may be four. The number of third low level pixels connected to the positive data line and the number of third low level pixels connected to the negative data line are equal to each other, and may be four. That is, the number of high level pixels connected to the positive data line may be twelve, the number of high level pixels connected to the negative data line may be twelve, the number of low level pixels connected to the positive data line may be twelve, and the number of low level pixels connected to the negative data line may be twelve, and are equal to each other.

Also, in each of the pixel rows PXR1 to PXR4, the number of high level pixels connected to the positive data line, the number of high level pixels connected to the negative data line, the number of low level pixels connected to the positive data line, and the number of low level pixels connected to the negative data line are equal to each other. Also, in each of the pixel columns PXC1 to PXC12, the number of high level pixels connected to the positive data line, the number of high level pixels connected to the negative data line, the number of low level pixels connected to the positive data line, and the number of low level pixels connected to the negative data line are equal to each other.

As described above, the number of high level pixels connected to the positive data line, the number of high level pixels connected to the negative data line, the number of low level pixels connected to the positive data line, and the number of low level pixels connected to the negative data line are all equal to each other in the row direction, the column direction, and the unit area UA. Even if the polarity of the data voltage applied to the plurality of data lines Dj to D(j+23) is reversed by the frame unit, this equivalency is maintained. Accordingly, crosstalk in which the transverse line or the longitudinal line appears and/or flicker in which the screen flickers, etc., are not generated.

Furthermore, as the data voltages of different luminance from each other for the same gray are applied to the high level pixel and the low level pixel, an inclination angle of the liquid crystal molecules in the high level pixel and the inclination angle of the liquid crystal molecules in the low level pixel are differentiated. Accordingly, when the pixel voltage of the high level pixel and the pixel voltage of the low level pixel are appropriately adjusted, an image viewed from the front is substantially similar to an image viewed from the side, thereby improving side (or lateral) visibility.

Next, various exemplary embodiments will be described with reference to FIGS. 6 to 19. Differences from the exemplary embodiments described in association with FIGS. 1 to 5 will be mainly described.

Figure 6:
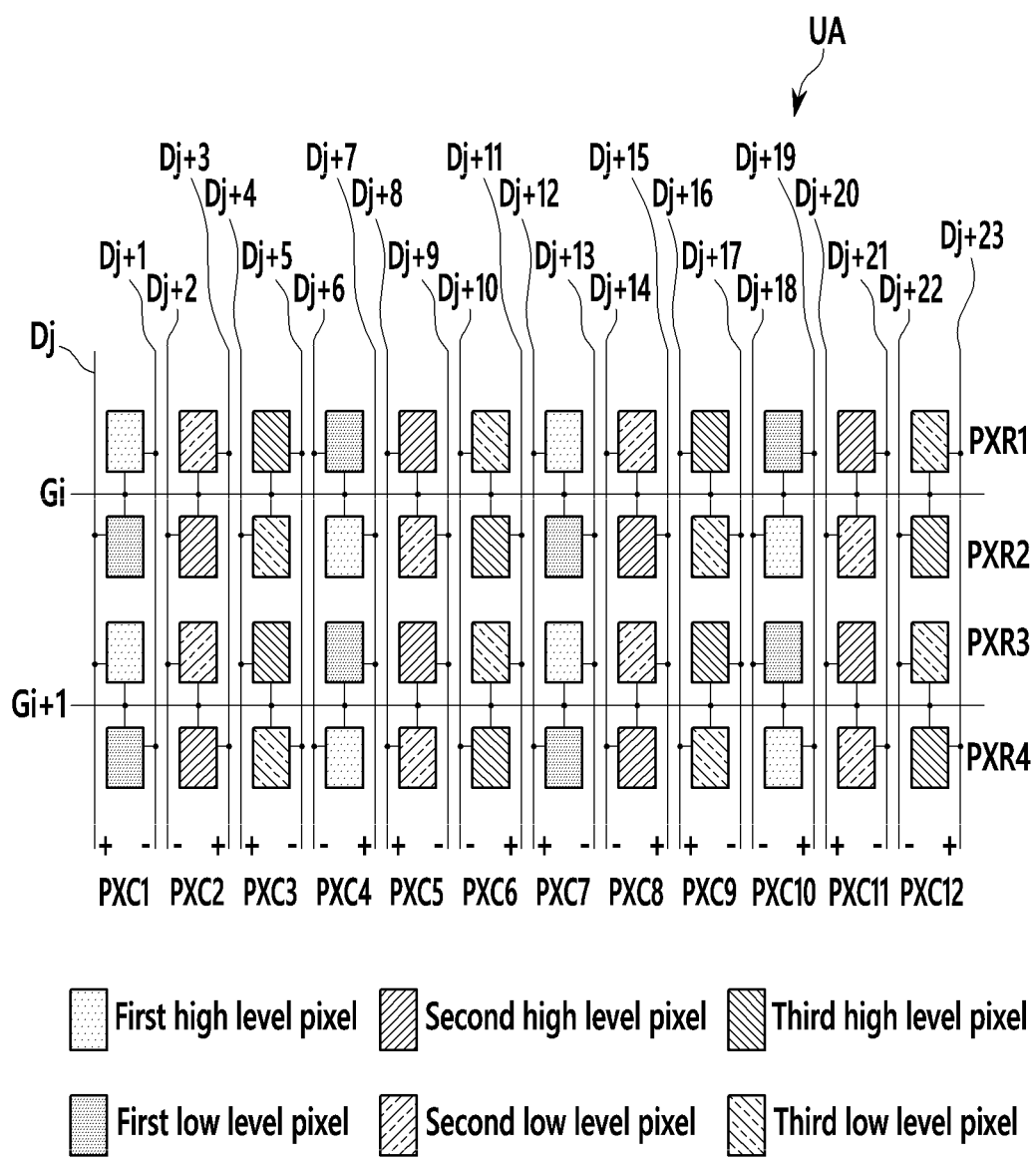
FIG. 6 is a view showing a configuration of a unit area of a display unit according to one or more exemplary embodiments.
Figure 7:
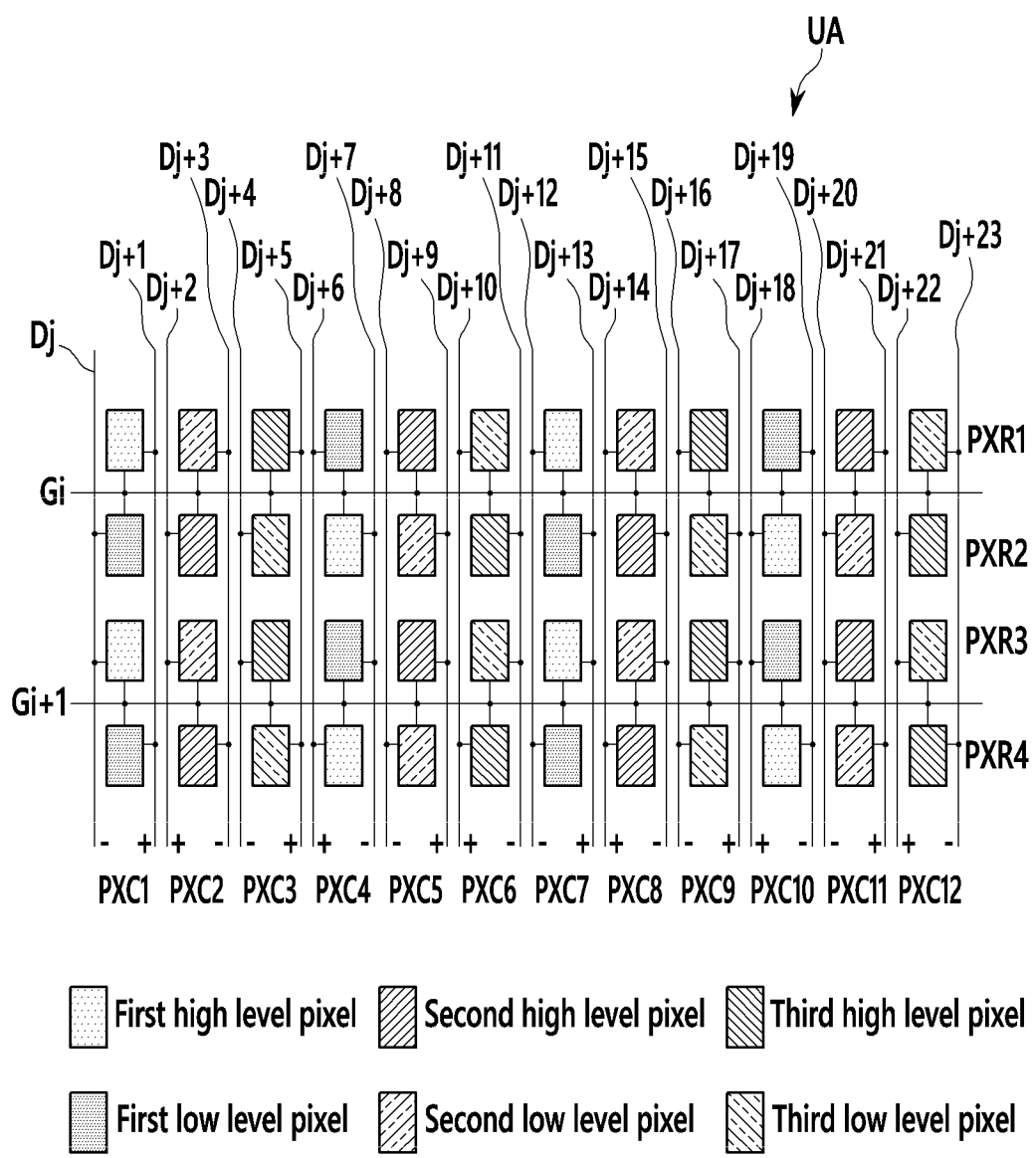
FIG. 7 is a view showing polarity inversion of a data voltage applied to a data line in a configuration of the unit area of FIG. 6 according to one or more exemplary embodiments.

FIG. 6 is a view showing a configuration of a unit area of a display unit according to one or more exemplary embodiments. FIG. 7 is a view showing polarity inversion of a data voltage applied to a data line in a configuration of the unit area of FIG. 6 according to one or more exemplary embodiments.

Referring to FIGS. 6 and 7, in the first pixel row PXR1 and the fourth pixel row PXR4, the pixels of the first to third columns PXC1 to PXC3 may be connected to the data line adjacent to the first side, the pixels of the fourth to ninth columns PXC4 to PXC9 may be connected to the data line adjacent to the second side, and the pixels of the tenth to twelfth columns PXC10 to PXC12 may be connected to the data line adjacent to the first side. Also, in the second pixel row PXR2 and the third pixel row PXR3, the pixels of the first to third columns PXC1 to PXC3 are connected to the data line adjacent to the second side, the pixels of the fourth to ninth columns PXC4 to PXC9 are connected to the data line adjacent to the first side, and the pixels of the tenth to twelfth columns PXC10 to PXC12 are connected to the data line adjacent to the second side. Here, the first side may be the right side of each of the plurality of pixels, and the second side may be the left side of each of the plurality of pixels.

Except for the above-noted differences, the configuration of the display device of FIGS. 1 to 5 may be applied to the display device of FIGS. 6 and 7 such that the description for the same features has been omitted to avoid obscuring exemplary embodiments.

In the pixel arrangement structure of FIG. 6, the number of high level pixels connected to the positive data line, the number of high level pixels connected to the negative data line, the number of low level pixels connected to the positive data line, and the number of low level pixels connected to the negative data line are all equal to each other in the row direction, the column direction, and the unit area UA. This equivalency may be maintained even if the polarity of the data voltage is reversed by the frame unit, such that the crosstalk, the flicker, etc., are not generated.

Figure 8:
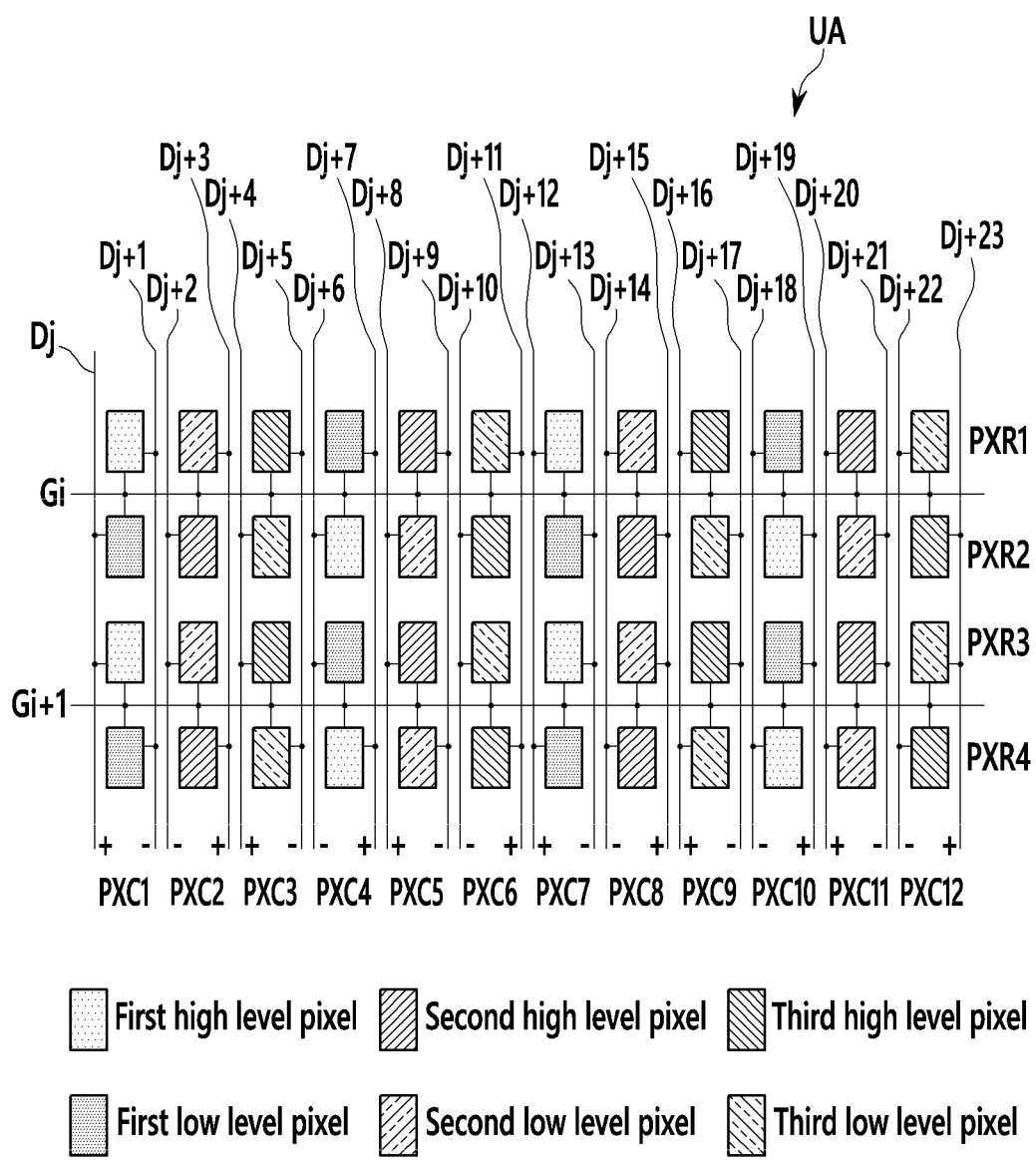
FIG. 8 is a view showing a configuration of a unit area of a display unit according to one or more exemplary embodiments.
Figure 9:
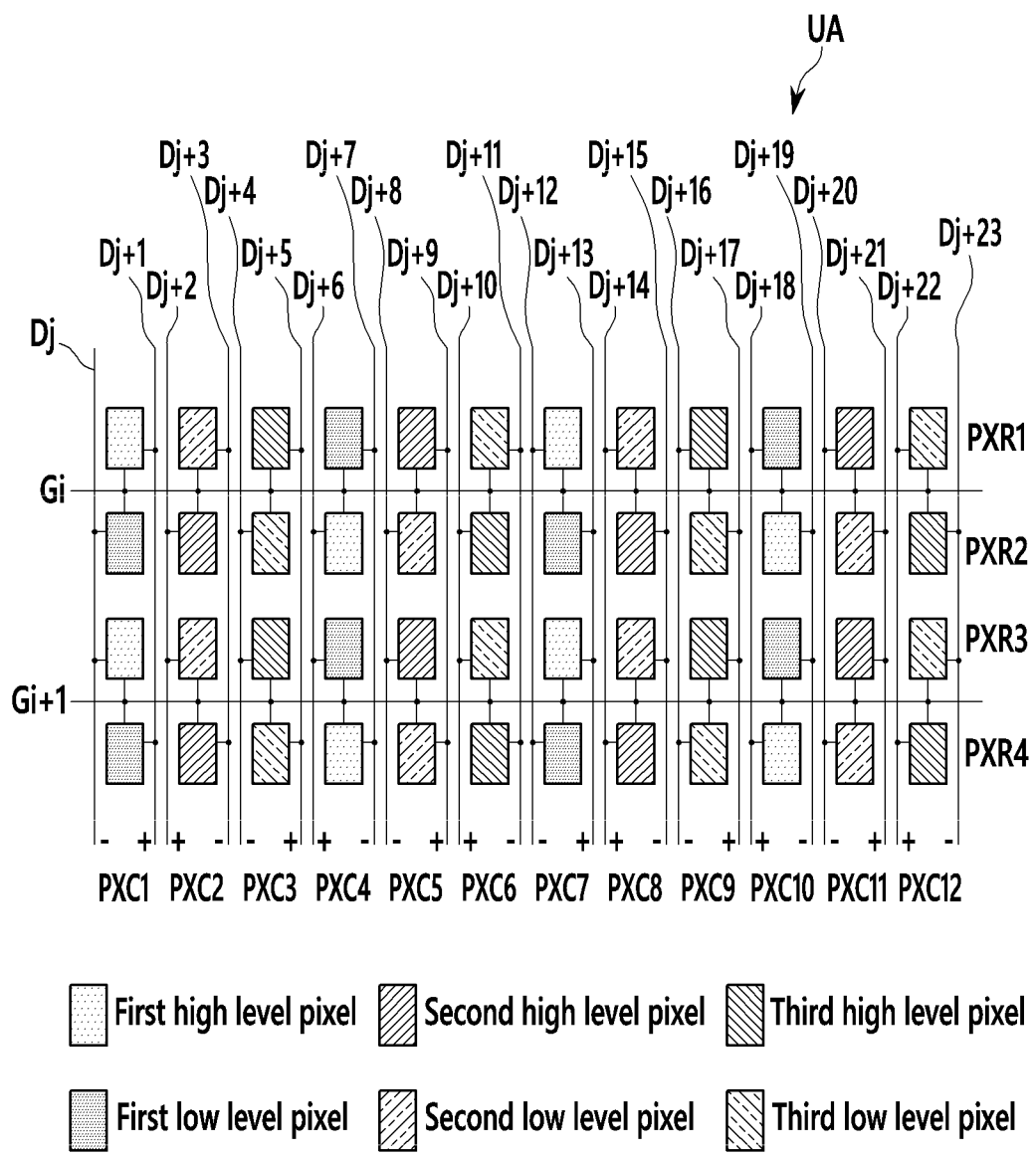
FIG. 9 is a view showing polarity inversion of a data voltage applied to a data line in a configuration of the unit area of FIG. 8 according to one or more exemplary embodiments.

FIG. 8 is a view showing a configuration of a unit area of a display unit according to one or more exemplary embodiments. FIG. 9 is a view showing polarity inversion of a data voltage applied to a data line in a configuration of the unit area of FIG. 8 according to one or more exemplary embodiments.

Referring to FIGS. 8 and 9, in the first pixel row PXR1 and the fourth pixel row PXR4, the pixels of the first to sixth columns PXC1 to PXC6 may be connected to the data line adjacent to the first side, and the pixels of the seventh to twelfth columns PXC7 to PXC12 may be connected to the data line adjacent to the second side. Also, in the second pixel row PXR2 and the third pixel row PXR3, the pixels of the first to sixth columns PXC1 to PXC6 may be connected to the data line adjacent to the second side, and the pixels of the seventh to twelfth columns PXC7 to PXC12 may be connected to the data line adjacent to the first side. Here, the first side may be the right side of each of the plurality of pixels, and the second side may be the left side of each of the plurality of pixels.

Except for the above-noted differences, the configuration of the display device of FIGS. 1 to 5 may be applied to the display device of FIGS. 8 and 9 such that the description for the same features has been omitted to avoid obscuring exemplary embodiments.

In the pixel arrangement structure of FIG. 8, the number of high level pixels connected to the positive data line, the number of high level pixels connected to the negative data line, the number of low level pixels connected to the positive data line, and the number of low level pixels connected to the negative data line are all equal to each other in the row direction, the column direction, and the unit area UA. This equivalency may be maintained even if the polarity of the data voltage is reversed by the frame unit, such that the crosstalk, the flicker, etc., are not generated.

Figure 10:
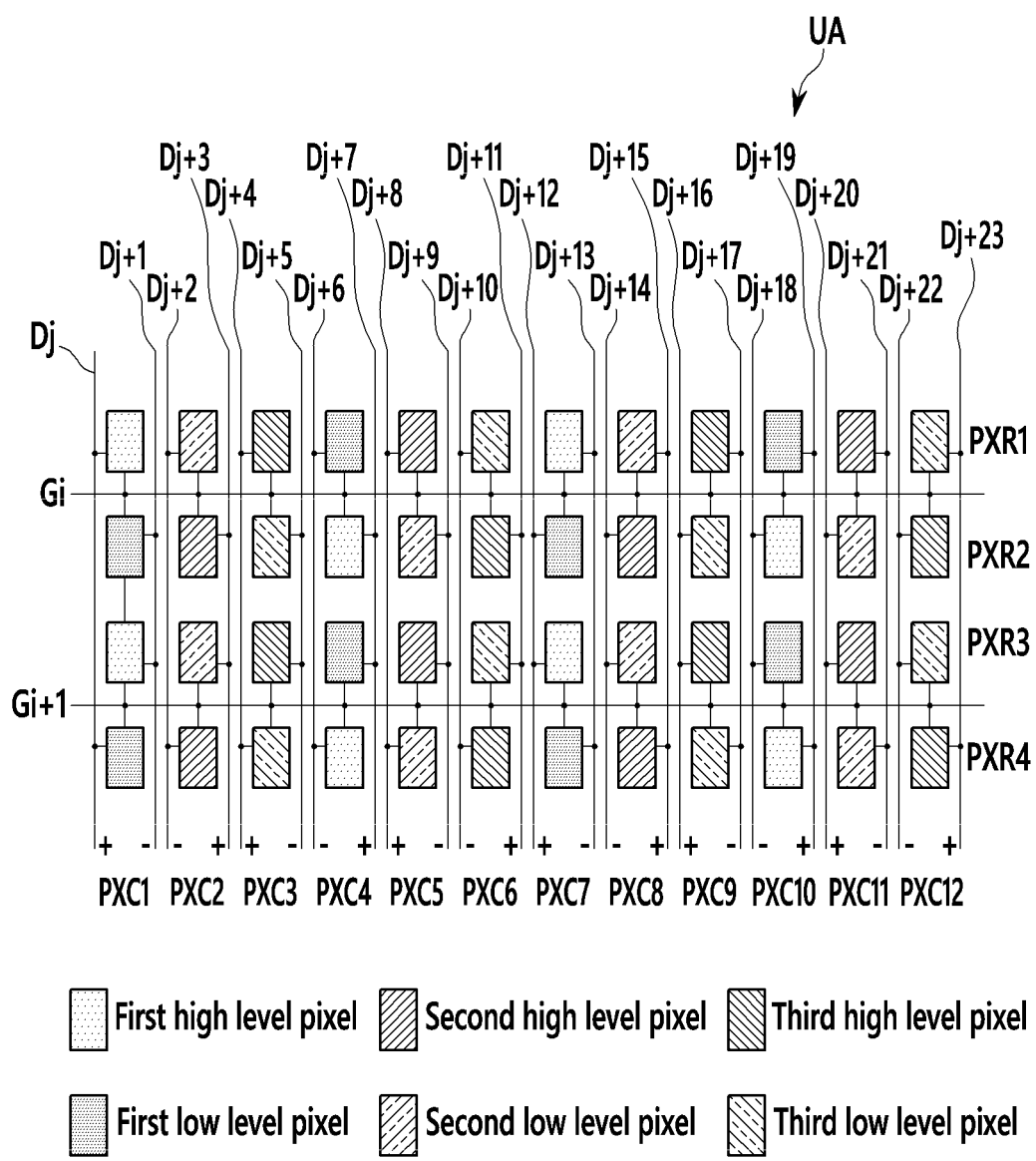
FIG. 10 is a view showing a configuration of a unit area of a display unit according to one or more exemplary embodiments.
Figure 11:
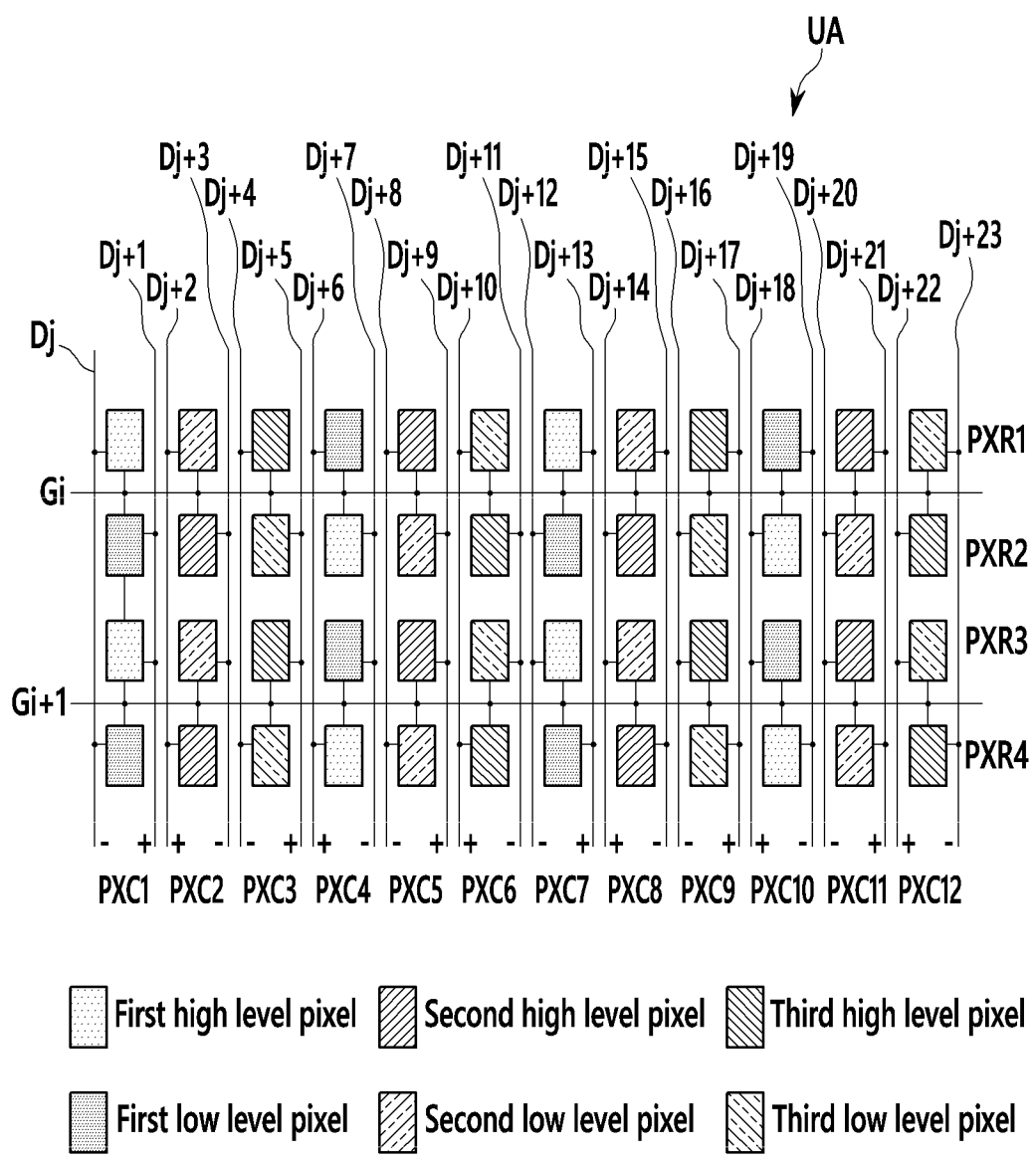
FIG. 11 is a view showing polarity inversion of a data voltage applied to a data line in a configuration of the unit area of FIG. 10 according to one or more exemplary embodiments.

FIG. 10 is a view showing a configuration of a unit area of a display unit according to one or more exemplary embodiments. FIG. 11 is a view showing polarity inversion of a data voltage applied to a data line in a configuration of the unit area of FIG. 10 according to one or more exemplary embodiments.

Referring to FIGS. 10 and 11, in the first pixel row PXR1 and the fourth pixel row PXR4, the pixels of the first to sixth columns PXC1 to PXC6 may be connected to the data line adjacent to the first side, and the pixels of the seventh to twelfth columns PXC7 to PXC12 may be connected to the data line adjacent to the second side. Also, in the second pixel row PXR2 and the third pixel row PXR3, the pixels of the first to sixth columns PXC1 to PXC6 may be connected to the data line adjacent to the second side, and the pixels of the seventh to twelfth columns PXC7 to PXC12 may be connected to the data line adjacent to the first side. Here, the first side may be the right side of each of the plurality of pixels, and the second side may be the left side of each of the plurality of pixels.

Except for the above-noted differences, the configuration of the display device of FIGS. 1 to 5 may be applied to the display device of FIGS. 10 and 11 such that the description for the same features has been omitted to avoid obscuring exemplary embodiments.

In the pixel arrangement structure of FIG. 10, the number of high level pixels connected to the positive data line, the number of high level pixels connected to the negative data line, the number of low level pixels connected to the positive data line, and the number of low level pixels connected to the negative data line are all equal to each other in the row direction, the column direction, and the unit area UA. This equivalency may be maintained even if the polarity of the data voltage is reversed by the frame unit, such that the crosstalk, the flicker, etc., are not generated.

Figure 12:
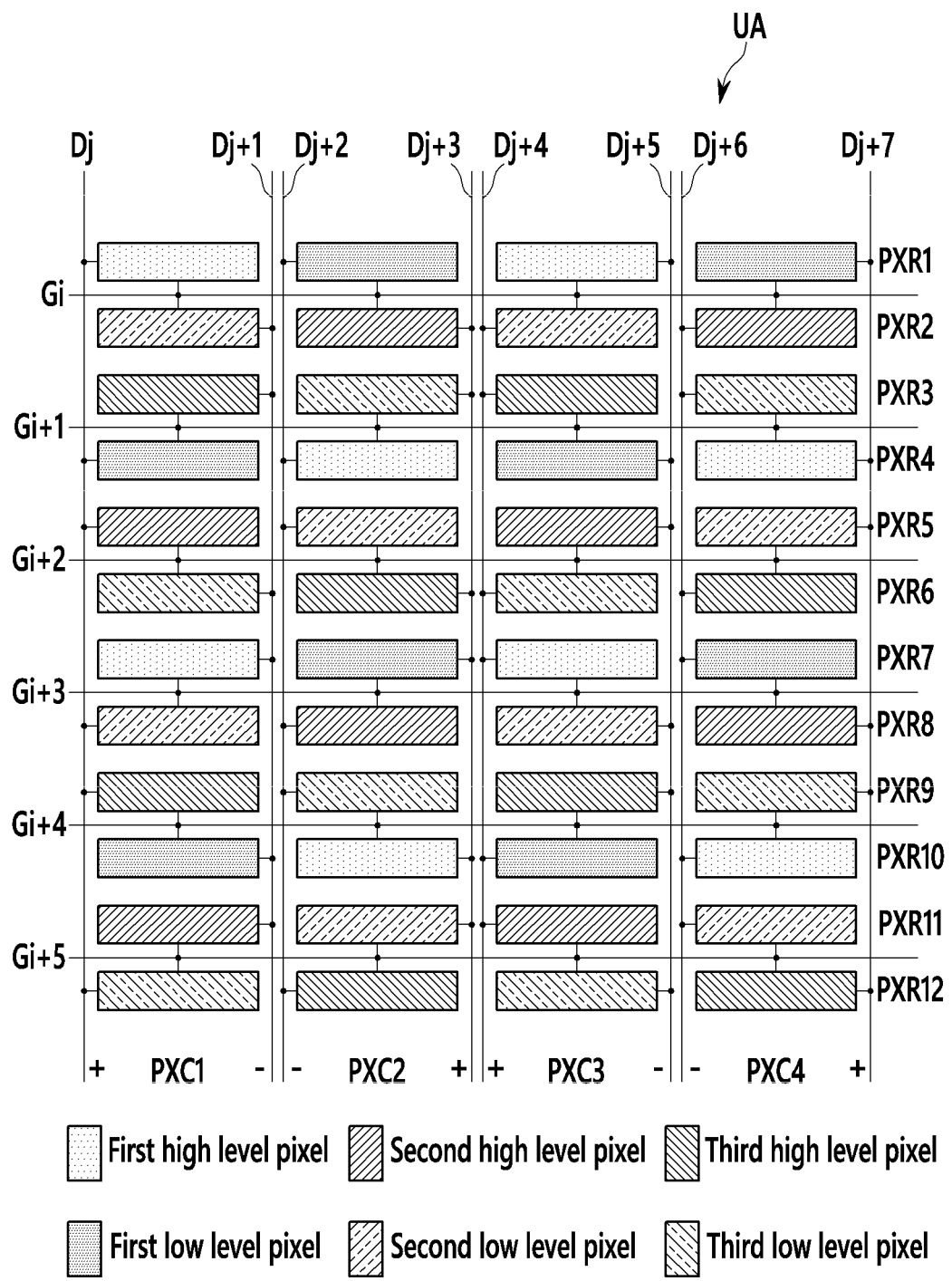
FIG. 12 is a view showing a configuration of a unit area of a display unit according to one or more exemplary embodiments.
Figure 13:
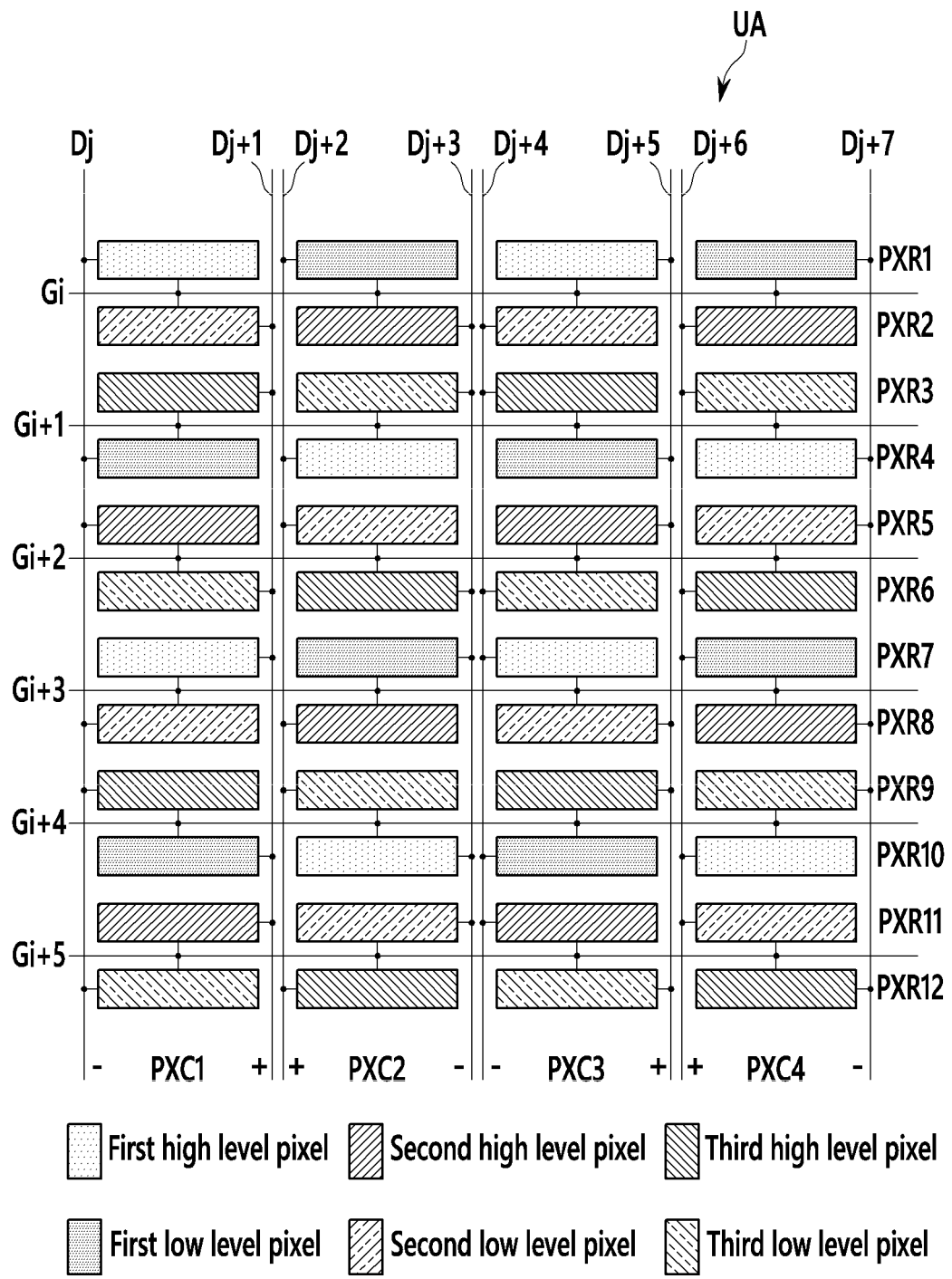
FIG. 13 is a view showing polarity inversion of a data voltage applied to a data line in a configuration of the unit area of FIG. 12 according to one or more exemplary embodiments.

FIG. 12 is a view showing a configuration of a unit area of a display unit according to one or more exemplary embodiments. FIG. 13 is a view showing polarity inversion of a data voltage applied to a data line in a configuration of the unit area of FIG. 12 according to one or more exemplary embodiments.

Referring to FIGS. 12 and 13, a plurality of pixels included in the unit area UA may be arranged in the matrix shape of twelve rows and four columns. That is, the plurality of pixels may be arranged in the matrix shape of the pixel rows PXR1 to PXR12 of twelve rows and the pixel columns PXC1 to PXC4 of four columns. Each of the plurality of pixels may have a longer shape in the row direction than the column direction.

The plurality of pixels may be alternately arranged in the order of the first color, the second color, and the third color in the column direction, and the high level pixels and the low level pixels may be alternately arranged in the row direction and the column direction.

Each of the plurality of gate lines Gi to G(i+5) may extend and may be positioned in the row direction between the two corresponding pixel rows. That is, the plurality of gate lines Gi to G(i+5) may be positioned one-by-one for two pixel rows. For example, the first gate line Gi may extend in the row direction between the first pixel row PXR1 and the second pixel row PXR2, and may be connected to the plurality of pixels of the first pixel row PXR1 and the plurality of pixels of the second pixel row PXR2. Also, the second gate line G(i+1) may extend in the row direction between the third pixel row PXR3 and the fourth pixel row PXR4, and may be connected to the plurality of pixels of the third pixel row PXR3 and the plurality of pixels of the fourth pixel row PXR4. The third gate line G(i+2) may extend in the row direction between the fifth pixel row PXR5 and the sixth pixel row PXR6, and may be connected to the plurality of pixels of the fifth pixel row PXR5 and the plurality of pixels of the sixth pixel row PXR6. The fourth gate line G(i+3) may extend in the row direction between the seventh pixel row PXR7 and the eighth pixel row PXR8, and may be connected to the plurality of pixels of the seventh pixel row PXR7 and the plurality of pixels of the eighth pixel row PXR8. The fifth gate line G(i+4) may extend in the row direction between the ninth pixel row PXR9 and the tenth pixel row PXR10, and may be connected to the plurality of pixels of the ninth pixel row PXR9 and the plurality of pixels of the tenth pixel row PXR10. The sixth gate line G(i+5) may extend in the row direction between the eleventh pixel row PXR11 and the twelfth pixel row PXR12, and may be connected to the plurality of pixels of the eleventh pixel row PXR11 and the plurality of pixels of the twelfth pixel row PXR12. The number of the plurality of gate lines Gi to G(i+5) is half of the number of the pixel rows PXR1 to PXR12.

The data lines Dj to D(j+7) that are different from each other are positioned at both sides of each of the plurality of pixel columns PXC1 to PXC4, and two data lines may be positioned between the adjacent pixel columns. The data voltages of the same polarity may be applied to two data lines positioned between the adjacent pixel columns, and the data voltages of the different polarities may be applied to the data line of both sides of each of the pixel columns PXC1 to PXC4. The number of the plurality of data lines Dj to D(j+7) is two times the number of the pixel columns PXC1 to PXC4.

As shown in FIG. 12, the data voltage applied from the first data line Dj to the eighth data line D(j+7) may have the polarity repeated in the order of positive (+), negative (−), negative (−), and positive (+).

The polarity of the data voltage applied to the plurality of data lines Dj to D(j+7) may be reversed by the frame unit. In a frame different from FIG. 12, as shown in FIG. 13, the data voltage applied from the first data line Dj to the eighth data line D(j+7) may have the polarity repeated in the order of negative (−), positive (+), positive (+), and negative (−).

The connection direction between the plurality of pixels and the plurality of data lines Dj to D(j+7) may be changed in the pixel column interval determined in the row direction. Also, the connection directions between the plurality of pixels and the plurality of data lines Dj to D(j+7) are opposite to each other in the odd-numbered pixel rows adjacent in the column direction, and the connection directions between the plurality of pixels and the plurality of data lines Dj to D(j+7) are opposite to each other in the even-numbered pixel rows adjacent in the column direction. Also, the plurality of pixels of the odd-numbered pixel rows and the plurality of pixels of the even-numbered pixel rows, which are connected to the same gate line, may be connected to the plurality of data lines Dj to D(j+7) in the different directions from each other.

As shown in FIGS. 12 and 13, in the first pixel row PXR1, the fourth pixel row PXR4, the fifth pixel row PXR5, the eighth pixel row PXR8, the ninth pixel row PXR9, and the twelfth pixel row PXR12, the pixels of the first and second columns PXC1 and PXC2 are connected to the data line adjacent to the first side, and the pixels of the third and fourth columns PXC3 and PXC4 are connected to the data line adjacent to the second side. Also, in the second pixel row PXR2, the third pixel row PXR3, the sixth pixel row PXR6, the seventh pixel row PXR7, the tenth pixel row PXR10, and the eleventh pixel row PXR11, the pixels of the first and second columns PXC1 and PXC2 are connected to the data line adjacent to the second side, and the pixels of the third and fourth columns PXC3 and PXC4 are connected to the data line adjacent to the first side. Here, the first side may be the left side of each of the plurality of pixels and the second side may be the right side of the plurality of pixels.

Except for the above-noted differences, the configuration of the display device of FIGS. 1 to 5 may be applied to the display device of FIGS. 12 and 13 such that the description for the same features has been omitted to avoid obscuring exemplary embodiments.

In the pixel arrangement structure of FIG. 12, the number of high level pixels connected to the positive data line, the number of high level pixels connected to the negative data line, the number of low level pixels connected to the positive data line, and the number of low level pixels connected to the negative data line are all equal to each other in the row direction, the column direction, and the unit area UA. This equivalency may be maintained even if the polarity of the data voltage is reversed by the frame unit, such that the crosstalk, the flicker, etc., are not generated.

Figure 14:
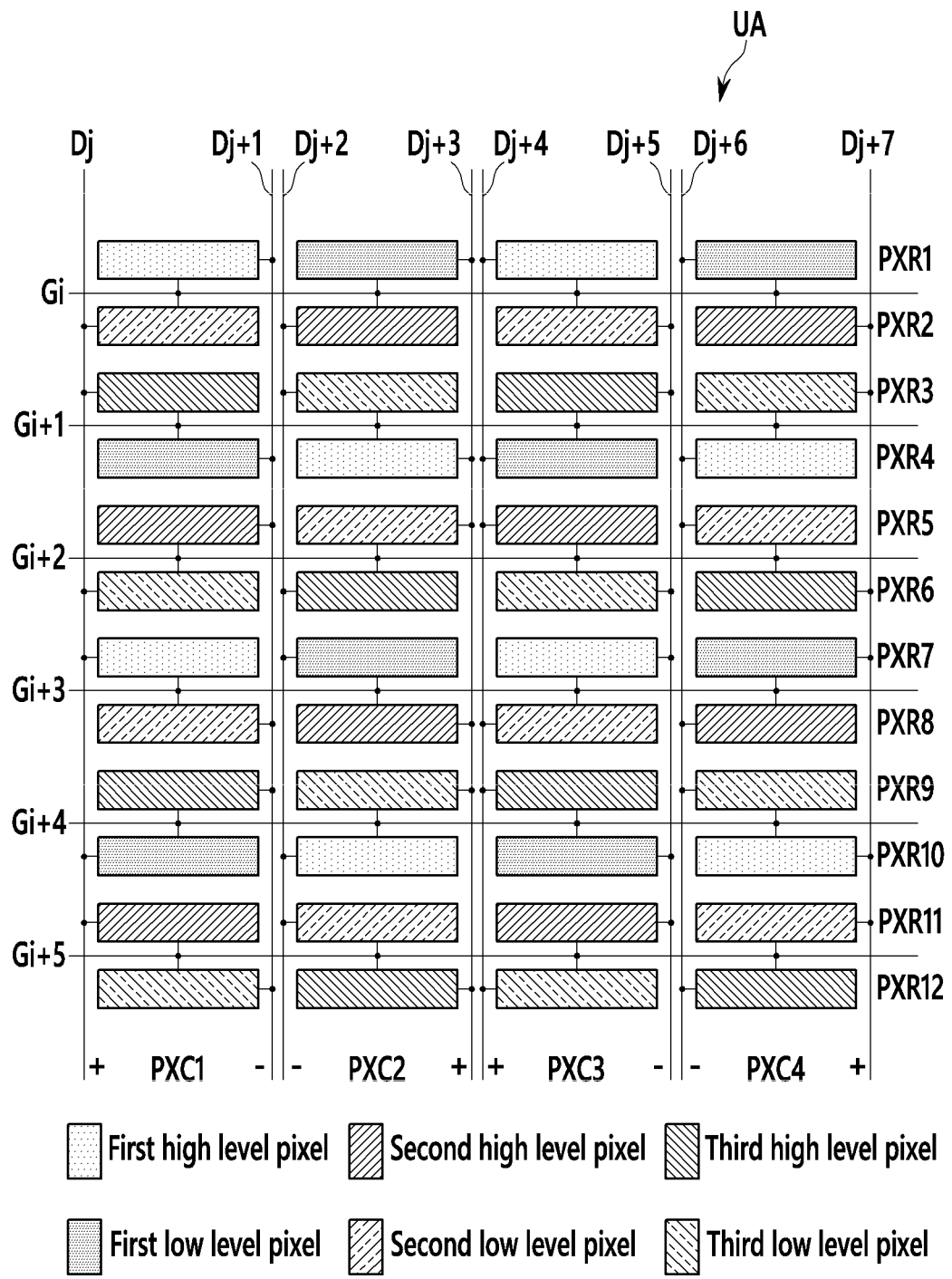
FIG. 14 is a view showing a configuration of a unit area of a display unit according to one or more exemplary embodiments.
Figure 15:
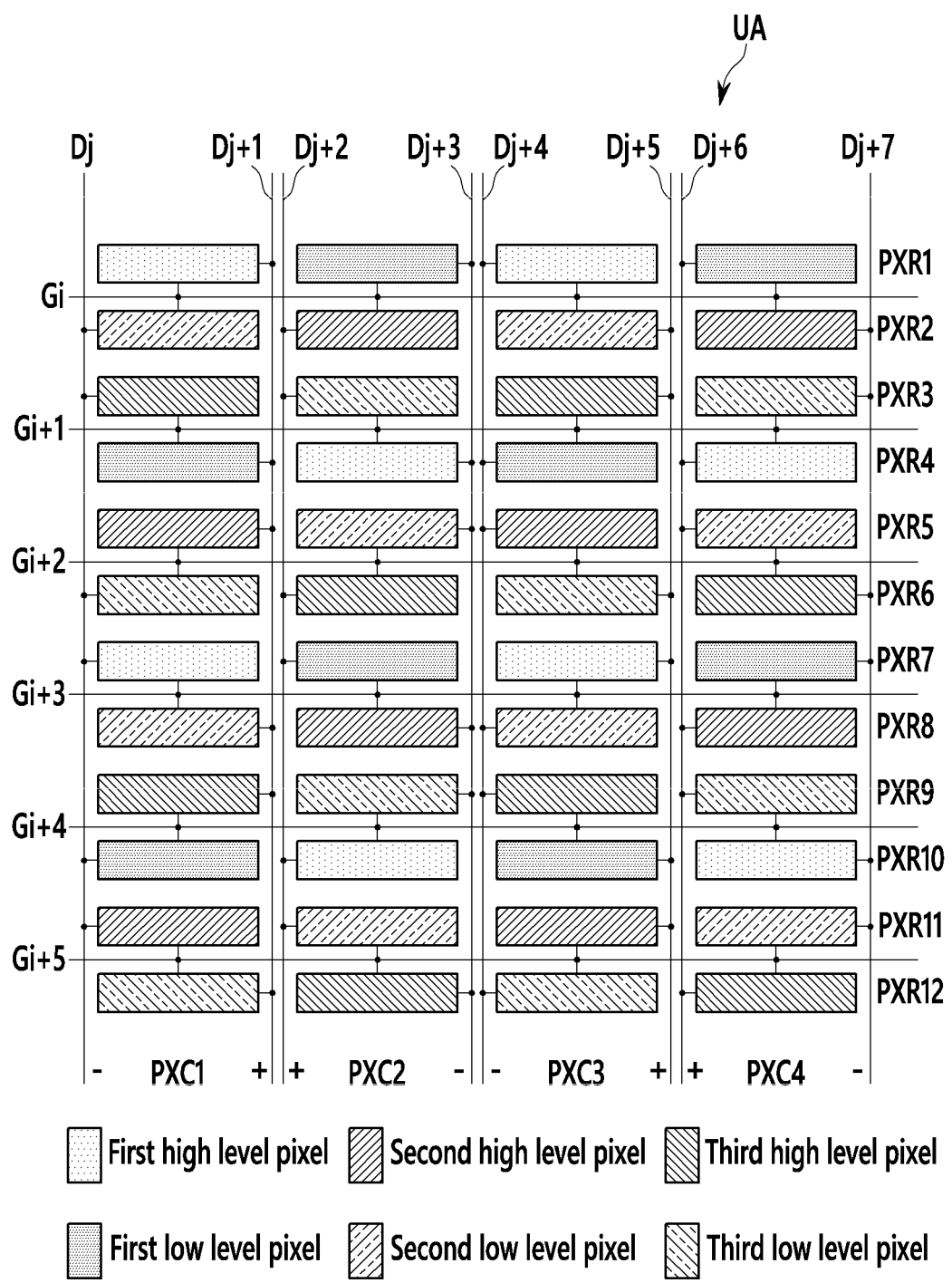
FIG. 15 is a view showing polarity inversion of a data voltage applied to a data line in a configuration of the unit area of FIG. 14 according to one or more exemplary embodiments.

FIG. 14 is a view showing a configuration of a unit area of a display unit according to one or more exemplary embodiments. FIG. 15 is a view showing polarity inversion of a data voltage applied to a data line in a configuration of the unit area of FIG. 14 according to one or more exemplary embodiments.

Referring to FIGS. 14 and 15, as a difference compared with FIGS. 12 and 13, in the first pixel row PXR1, the fourth pixel row PXR4, the fifth pixel row PXR5, the eighth pixel row PXR8, the ninth pixel row PXR9, and the twelfth pixel row PXR12, the pixels of the first and second columns PXC1 and PXC2 are connected to the data line adjacent to the first side, and the pixels of the third and fourth column PXC3 and PXC4 are connected to the data line adjacent to the second side. Also, in the second pixel row PXR2, the third pixel row PXR3, the sixth pixel row PXR6, the seventh pixel row PXR7, the tenth pixel row PXR10, and the eleventh pixel row PXR11, the pixels of the first and second columns PXC1 and PXC2 are connected to the data line adjacent to the second side, and the pixels of the third and fourth columns PXC3 and PXC4 are connected to the data line adjacent to the first side. Here, the first side may be the right side of each of the plurality of pixels, and the second side may be the left side of each of the plurality of pixels.

Except for the above-noted differences, the configurations of the display devices of FIGS. 1 to 5, 12, and 13 may be applied to the display device of FIGS. 14 and 15 such that the description for the same features has been omitted to avoid obscuring exemplary embodiments.

In the pixel arrangement structure of FIG. 14, the number of high level pixels connected to the positive data line, the number of high level pixels connected to the negative data line, the number of low level pixels connected to the positive data line, and the number of low level pixels connected to the negative data line are all equal to each other in the row direction, the column direction, and the unit area UA, and this rule may be maintained even if the polarity of the data voltage is reversed by the frame unit, such that the crosstalk, the flicker, etc. are not generated.

Figure 16:
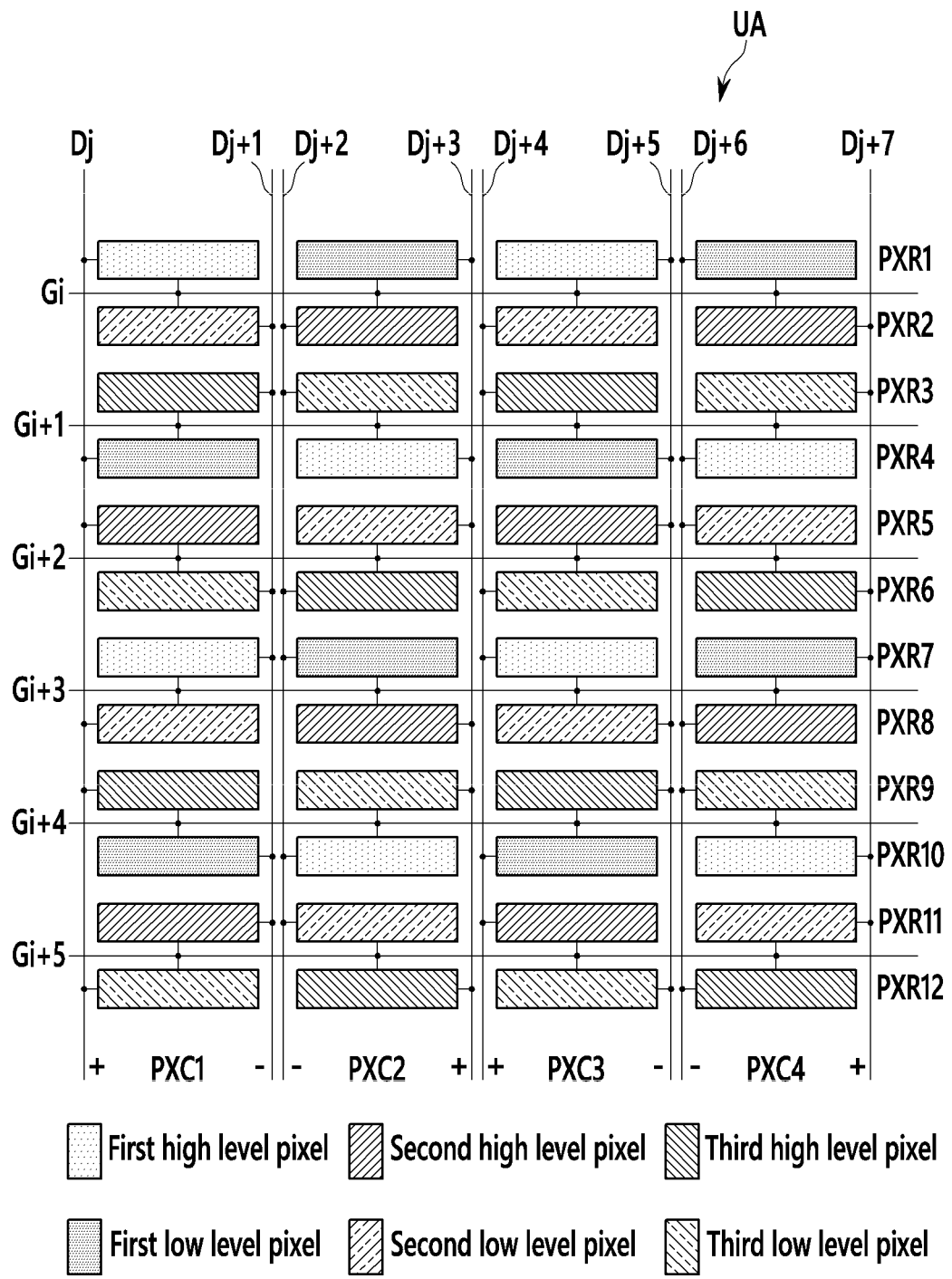
FIG. 16 is a view showing a configuration of a unit area of a display unit according to one or more exemplary embodiments.
Figure 17:
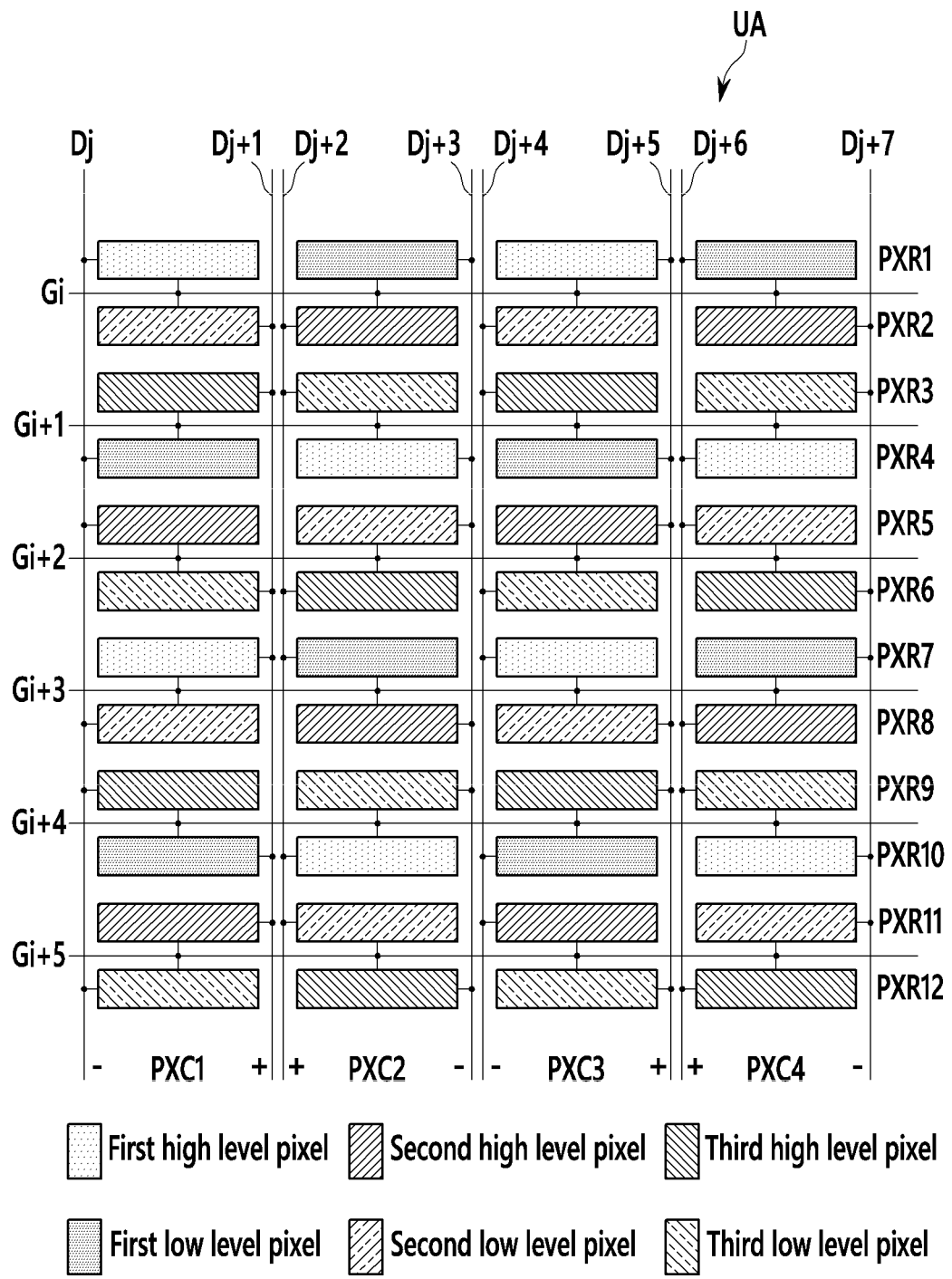
FIG. 17 is a view showing polarity inversion of a data voltage applied to a data line in a configuration of the unit area of FIG. 16 according to one or more exemplary embodiments.

FIG. 16 is a view showing a configuration of a unit area of a display unit according to one or more exemplary embodiments. FIG. 17 is a view showing polarity inversion of a data voltage applied to a data line in a configuration of the unit area of FIG. 16 according to one or more exemplary embodiments.

Referring to FIGS. 16 and 17, as a difference compared with the display device of FIGS. 12 and 13, in the first pixel row PXR1, the fourth pixel row PXR4, the fifth pixel row PXR5, the eighth pixel row PXR8, the ninth pixel row PXR9, and the twelfth pixel row PXR12, the pixels of the first and fourth columns PXC1 and PXC4 are connected to the data line adjacent to the first side, and the pixels of the second and third columns PXC2 and PXC3 are connected to the data line adjacent to the second side. Also, in the second pixel row PXR2, the third pixel row PXR3, the sixth pixel row PXR6, the seventh pixel row PXR7, the tenth pixel row PXR10, and the eleventh pixel row PXR11, the pixels of the first and fourth columns PXC1 and PXC4 are connected to the data line adjacent to the second side, and the pixels of the second and third columns PXC2 and PXC3 are connected to the data line adjacent to the first side. Here, the first side may be the left side of each of the plurality of pixels and the second side may be the right side of each of the plurality of pixels.

Except for the above-noted differences, the configurations of the display devices of FIGS. 1 to 5, 12, and 13 may be applied to the display device of FIGS. 16 and 17 such that the description for the same features has been omitted to avoid obscuring exemplary embodiments.

In the pixel arrangement structure of FIG. 16, the number of high level pixels connected to the positive data line, the number of high level pixels connected to the negative data line, the number of low level pixels connected to the positive data line, and the number of low level pixels connected to the negative data line are all equal to each other in the row direction, the column direction, and the unit area UA, and this rule may be maintained even if the polarity of the data voltage is reversed by the frame unit, such that the crosstalk, the flicker, etc. are not generated.

Figure 18:
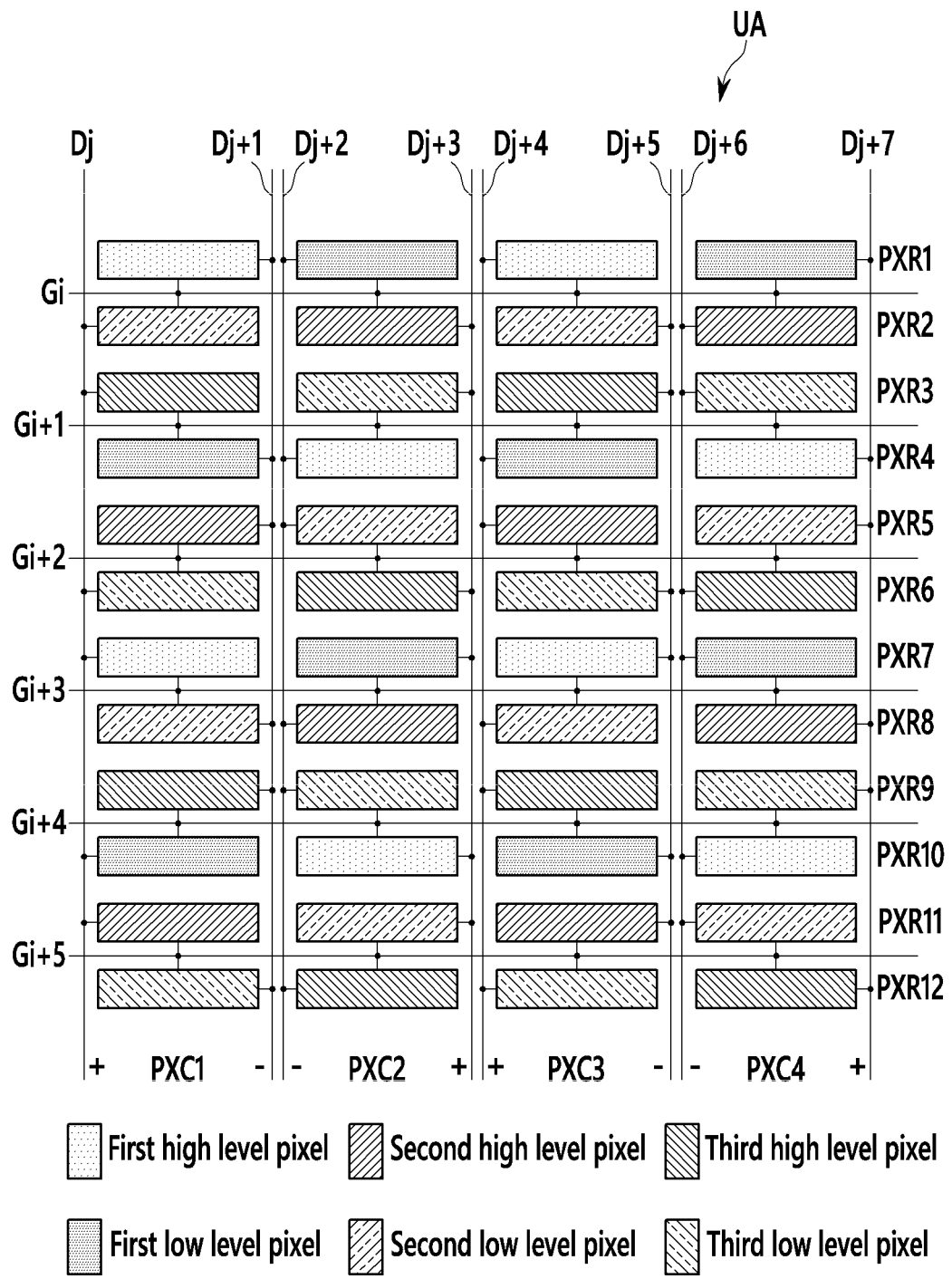
FIG. 18 is a view showing a configuration of a unit area of a display unit according to one or more exemplary embodiments.
Figure 19:
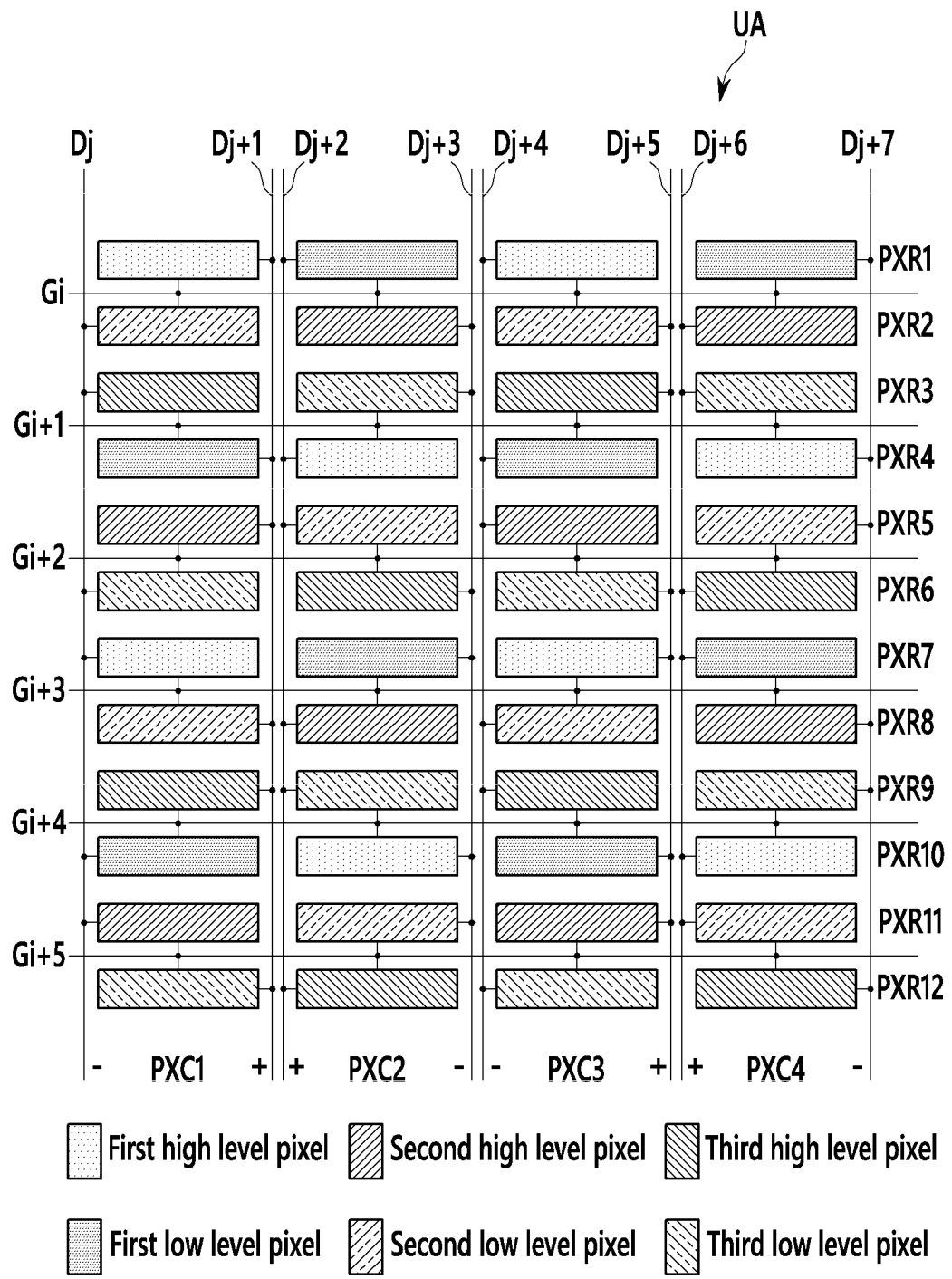
FIG. 19 is a view showing polarity inversion of a data voltage applied to a data line in a configuration of the unit area of FIG. 18 according to one or more exemplary embodiments.

FIG. 18 is a view showing a configuration of a unit area of a display unit according to one or more exemplary embodiments. FIG. 19 is a view showing polarity inversion of a data voltage applied to a data line in a configuration of the unit area of FIG. 18 according to one or more exemplary embodiments.

Referring to FIGS. 18 and 19, as a difference compared with the display device of FIGS. 12 and 13, in the first pixel row PXR1, the fourth pixel row PXR4, the fifth pixel row PXR5, the eighth pixel row PXR8, the ninth pixel row PXR9, and the twelfth pixel row PXR12, the pixels of the first and fourth columns PXC1 and PXC4 are connected to the data line adjacent to the first side, and the pixels of the second and third columns PXC2 and PXC3 are connected to the data line adjacent to the second side. Also, in the second pixel row PXR2, the third pixel row PXR3, the sixth pixel row PXR6, the seventh pixel row PXR7, the tenth pixel row PXR10, and the eleventh pixel row PXR11, the pixels of the first and fourth columns PXC1 and PXC4 are connected to the data line adjacent to the second side, and the pixels of the second and third columns PXC2 and PXC3 are connected to the data line adjacent to the first side. Here, the first side may be the right side of each of the plurality of pixels and the second side may be the left side of each of the plurality of pixels.

Except for the above-noted differences, the configurations of the display devices of FIGS. 1 to 5, 12, and 13 may be applied to the display device of FIGS. 18 and 19 such that the description for the same features has been omitted to avoid obscuring exemplary embodiments.

In the pixel arrangement structure of FIG. 18, the number of high level pixels connected to the positive data line, the number of high level pixels connected to the negative data line, the number of low level pixels connected to the positive data line, and the number of low level pixels connected to the negative data line are all equal to each other in the row direction, the column direction, and the unit area UA, and this rule may be maintained even if the polarity of the data voltage is reversed by the frame unit, such that the crosstalk, the flicker, etc. are not generated.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising
a display panel comprising unit areas,
wherein each of the unit areas comprises:
   a plurality of pixels;
   a plurality of gate lines connected to the plurality of pixels; and
   a plurality of data lines connected to the plurality of pixels,
wherein:
   a first two data lines are disposed between a first pixel column and a second pixel column adjacent to the first pixel column;
   a second two data lines are disposed between the second pixel column and a third pixel column adjacent to the second pixel column;
   data voltages of a positive polarity are applied to the first two data lines;

data voltages of a negative polarity are applied to the second two data lines;
a connection direction between the plurality of pixels and the plurality of data lines in each of a plurality of pixel rows is changed in an at least two pixel column interval;
a pixel of a first odd-numbered pixel row connected to a first gate line and a pixel of a second odd-numbered pixel row connected to a second gate line in a same pixel column as and adjacent to the pixel of the first odd-numbered pixel row in a column direction are connected to different data lines, the second gate line being different from the first gate line; and
a pixel of a first even-numbered pixel row connected to the first gate line and a pixel of a second even-numbered pixel row connected to the second gate line in a same pixel column as and adjacent to the pixel of the first even-numbered pixel row in the column direction are connected to different data lines.

2. The display device of claim 1, wherein:
each of the plurality of gate lines extend one-by-one for two correspondingly different pixel rows in a row direction such that pixels of a same column, adjacent in the column direction, and connected to a same gate line are connected to different data lines from each other.

3. The display device of claim 2, wherein the plurality of pixels are arranged in a matrix formation of four pixel rows and twelve pixel columns.

4. The display device of claim 3, wherein:
in the first and fourth pixel rows of the four pixel rows, pixels of the first to third pixel columns of the twelve pixel columns are connected to a data line adjacent to a first side, pixels of the fourth to ninth pixel columns of the twelve pixel columns are connected to a data line adjacent to a second side, and pixels of the tenth to twelfth pixel columns of the twelve pixel columns are connected to a data line adjacent to the first side; and
in the second and third pixel rows of the four pixel rows, pixels of the first to third pixel columns of the twelve pixel columns are connected to a data line adjacent to the second side, pixels of the fourth to ninth pixel columns of the twelve pixel columns are connected to a data line adjacent to the first side, and pixels of the tenth to twelfth pixel columns of the twelve pixel columns are connected to a data line adjacent to the second side.

5. The display device of claim 4, wherein:
the first side is a left side of each of the pixels; and
the second side is a right side of each of the pixels.

6. The display device of claim 4, wherein:
the first side is a right side of each of the pixels; and
the second side is a left side of each of the pixels.

7. The display device of claim 3, wherein:
in the first and fourth pixel rows of the four pixel rows, pixels of the first to sixth pixel columns of the twelve pixel columns are connected to a data line adjacent to a first side, and pixels of the seventh to twelfth pixel columns of the twelve pixel columns are connected to a data line adjacent to the second side; and
in the second and third pixel rows of the four pixel rows, pixels of the first to sixth pixel columns of the twelve pixel columns are connected to a data line adjacent to the second side, and pixels of the seventh to twelfth pixel columns of the twelve pixel columns are connected to a data line adjacent to the first side.

8. The display device of claim 7, wherein:
the first side is a right side of each of the pixels; and
the second side is a left side of each of the pixels.

9. The display device of claim 7, wherein:
the first side is a left side of each of the pixels; and
the second side is a right side of each of the pixels.

10. The display device of claim 2, wherein the plurality of pixels are arranged in a matrix formation of twelve pixel rows and four pixel columns.

11. The display device of claim 10, wherein:
in the first, fourth, fifth, eighth, ninth, and twelfth pixel rows of the twelve pixel rows, pixels of the first and second pixel columns of the four pixel columns are connected to a data line adjacent to a first side, and pixels of the third and fourth pixel columns of the four pixel columns are connected to a data line adjacent to a second side; and
in the second, third, sixth, seventh, tenth, and eleventh pixel rows of the twelve pixel rows, pixels of the first and second pixel columns of the four pixel columns are connected to a data line adjacent to the second side, and pixels of the third and fourth pixel columns of the four pixel columns are connected to a data line adjacent to the first side.

12. The display device of claim 11, wherein:
the first side is a left side of each of the pixels; and
the second side is a right side of each of the pixels.

13. The display device of claim 11, wherein:
the first side is a right side of each of the pixels; and
the second side is a left side of each of the pixels.

14. The display device of claim 10, wherein:
in the first, fourth, fifth, eighth, ninth, and twelfth pixel rows of the twelve pixel rows, pixels of the first and fourth pixel columns of the four pixel columns are connected to a data line adjacent to a first side, and pixels of the second and third pixel columns of the four pixel columns are connected to a data line adjacent to a second side; and
in the second, third, sixth, seventh, tenth, and eleventh pixel rows of the twelve pixel rows, pixels of the first and fourth pixel columns of the four pixel columns are connected to a data line adjacent to the second side, and pixels of the second and third pixel columns of the four pixel columns are connected to a data line adjacent to the first side.

15. The display device of claim 14, wherein:
the first side is a left side of each of the pixels; and
the second side is a right side of each of the pixels.

16. The display device of claim 14, wherein:
the first side is a right side of each of the pixels; and
the second side is a left side of each of the pixels.

17. The display device of claim 1, wherein:
the plurality of pixels comprise:
a plurality of high level pixels configured to receive a data voltage of a relatively high luminance; and
a plurality of low level pixels configured to receive a data voltage of a relatively low luminance; and
a number of high level pixels of the plurality of high level pixels connected to data lines of a positive polarity of the data lines, a number of high level pixels of the plurality of high level pixels connected to data lines of a negative polarity of the data lines, a number of low level pixels of the plurality of low level pixels connected to the data lines of the positive polarity, and a number of low level pixels of the plurality of low level pixels connected to the data lines of the negative polarity are equal to each other.

18. The display device of claim 1, wherein the pixel of the first even-numbered pixel row and the pixel of the second odd-numbered pixel row are connected to a same data line and not a same gate line.

19. A display device comprising:
pixels arranged in a matrix shape; and
data lines connected to the pixels,
wherein the display device is configured to:
    apply data voltages of a same polarity to first data lines of the data lines, the first data lines being positioned between adjacent pixel columns; and
    apply data voltages of different polarities to second data lines of the data lines, the second data lines being positioned at respective sides of each pixel column,
wherein the pixels comprise:
    a plurality of high level pixels to receive a data voltage of a relatively high luminance; and
    a plurality of low level pixels to receive a data voltage of a relatively low luminance, and
wherein a number of high level pixels of the plurality of high level pixels connected to first data lines of a positive polarity of the data lines, a number of high level pixels of the plurality of high level pixels connected to second data lines of a negative polarity of the data lines, a number of low level pixels of the plurality of low level pixels connected to the first data lines, and a number of low level pixels of the plurality of low level pixels connected to the second data lines are equal to each other.

20. The display device of claim 19, wherein:
the plurality of high level pixels comprise:
    first high level pixels of a first color;
    second high level pixels of a second color; and
    third high level pixels of a third color; and
the plurality of low level pixels comprise:
    first low level pixels of the first color;
    second low level pixels of the second color; and
    third low level pixels of the third color.

21. The display device of claim 20, wherein a number of the first high level pixels connected to the first data lines, a number of the first high level pixels connected to the second data lines, a number of second high level pixels connected to the first data lines, a number of second high level pixels connected to the second data lines, a number of third high level pixels connected to the first data lines, a number of third high level pixels connected to the second data lines, a number of first low level pixels connected to the first data lines, a number of first low level pixels connected to the second data lines, a number of second low level pixels connected to the first data lines, a number of second low level pixels connected to the second data lines, a number of third low level pixels connected to the first data lines, and a number of third low level pixel connected to the second data lines are equal to each other.

* * * * *